(12) United States Patent
Westhoff, Jr. et al.

(10) Patent No.: US 9,863,498 B1
(45) Date of Patent: Jan. 9, 2018

(54) FLYWHEEL ASSEMBLY FOR AN OUTBOARD ENGINE

(71) Applicant: BRP US INC., Sturtevant, WI (US)

(72) Inventors: Paul Westhoff, Jr., Kenosha, WI (US); John Charles Scott, Lake Villa, IL (US); Dale Wiegele, Kenosha, WI (US); Jonathan Servais, Kenosha, WI (US)

(73) Assignee: BRP US INC., Sturtevant, WI (US)

( * ) Notice: Subject to any disclaimer, the term of this patent is extended or adjusted under 35 U.S.C. 154(b) by 755 days.

(21) Appl. No.: 14/292,174

(22) Filed: May 30, 2014

Related U.S. Application Data

(60) Provisional application No. 61/830,041, filed on May 31, 2013.

(51) Int. Cl.
| | |
|---|---|
| *F02B 77/04* | (2006.01) |
| *F16F 15/315* | (2006.01) |
| *F16P 1/02* | (2006.01) |
| *B60W 10/30* | (2006.01) |
| *B60W 10/06* | (2006.01) |

(52) U.S. Cl.
CPC .......... *F16F 15/315* (2013.01); *B60W 10/06* (2013.01); *B60W 10/30* (2013.01); *F16P 1/02* (2013.01)

(58) Field of Classification Search
CPC ............... F02B 61/045; F02B 29/0406; F02M 35/10288; F02M 35/1255
USPC ............................. 123/198 E, 185.3; 440/77
See application file for complete search history.

(56) References Cited

U.S. PATENT DOCUMENTS

| | | | | |
|---|---|---|---|---|
| 4,520,688 | A | * 6/1985 | Ban | F02B 75/06 74/572.1 |
| 4,589,379 | A | * 5/1986 | Fujikawa | F01P 5/06 123/41.49 |
| 4,721,485 | A | 1/1988 | Suzuki | |
| 4,734,070 | A | 3/1988 | Mondek | |

(Continued)

OTHER PUBLICATIONS

Flywheel and Stator; Bombardier Recreational Products Inc.; BRP Part Catalogs; Evinrude 300-2012; www.epabrp.com; Retrieved form internet on Feb. 12, 2015.

(Continued)

*Primary Examiner* — Marguerite McMahon
*Assistant Examiner* — James Kim
(74) *Attorney, Agent, or Firm* — BCF LLP

(57) ABSTRACT

An outboard engine has a cowling defining an engine compartment and an outlet fluidly communicating therewith. An engine housed in the engine compartment includes an engine block and an output shaft defining an output shaft axis, an axial direction, a radial direction and a circumferential direction. An outer end thereof extends outside the engine block. A flywheel mounted thereto rotates therewith. A cover fixed with respect to the engine block defines a chamber housing the flywheel disposed axially between the engine block and the cover, and radially between the output shaft and the cover. The cover includes a channel member defining a channel between a first end and a second end fluidly communicating with the outlet. The channel member defines a cross-sectional area of the channel. A circumferentially-extending portion of the channel is continuous with the chamber and has a cross-sectional area increasing towards the second end.

20 Claims, 20 Drawing Sheets

(56) References Cited

U.S. PATENT DOCUMENTS

| | | | | |
|---|---|---|---|---|
| 4,874,959 | A | * | 10/1989 | Sheridan .................. H02K 5/20 |
| | | | | 290/1 B |
| 4,968,276 | A | | 11/1990 | Hashimoto |
| 5,083,538 | A | * | 1/1992 | Hubbell ................ F02B 61/045 |
| | | | | 123/195 C |
| 5,503,577 | A | * | 4/1996 | Ming ........................ F01L 1/02 |
| | | | | 440/76 |
| 5,996,546 | A | | 12/1999 | Kollmann et al. |
| 2012/0097124 | A1 | * | 4/2012 | Zhang ...................... H02K 7/14 |
| | | | | 123/179.25 |
| 2013/0180497 | A1 | * | 7/2013 | Saiki ...................... B60K 6/485 |
| | | | | 123/197.1 |

OTHER PUBLICATIONS

Flywheel Cover; Bombardier Recreational Products Inc.; BRP Part Catalogs; Johnson 90-2003; www.epc.brp.com; Retrieved form internet on Feb. 12, 2015.

* cited by examiner

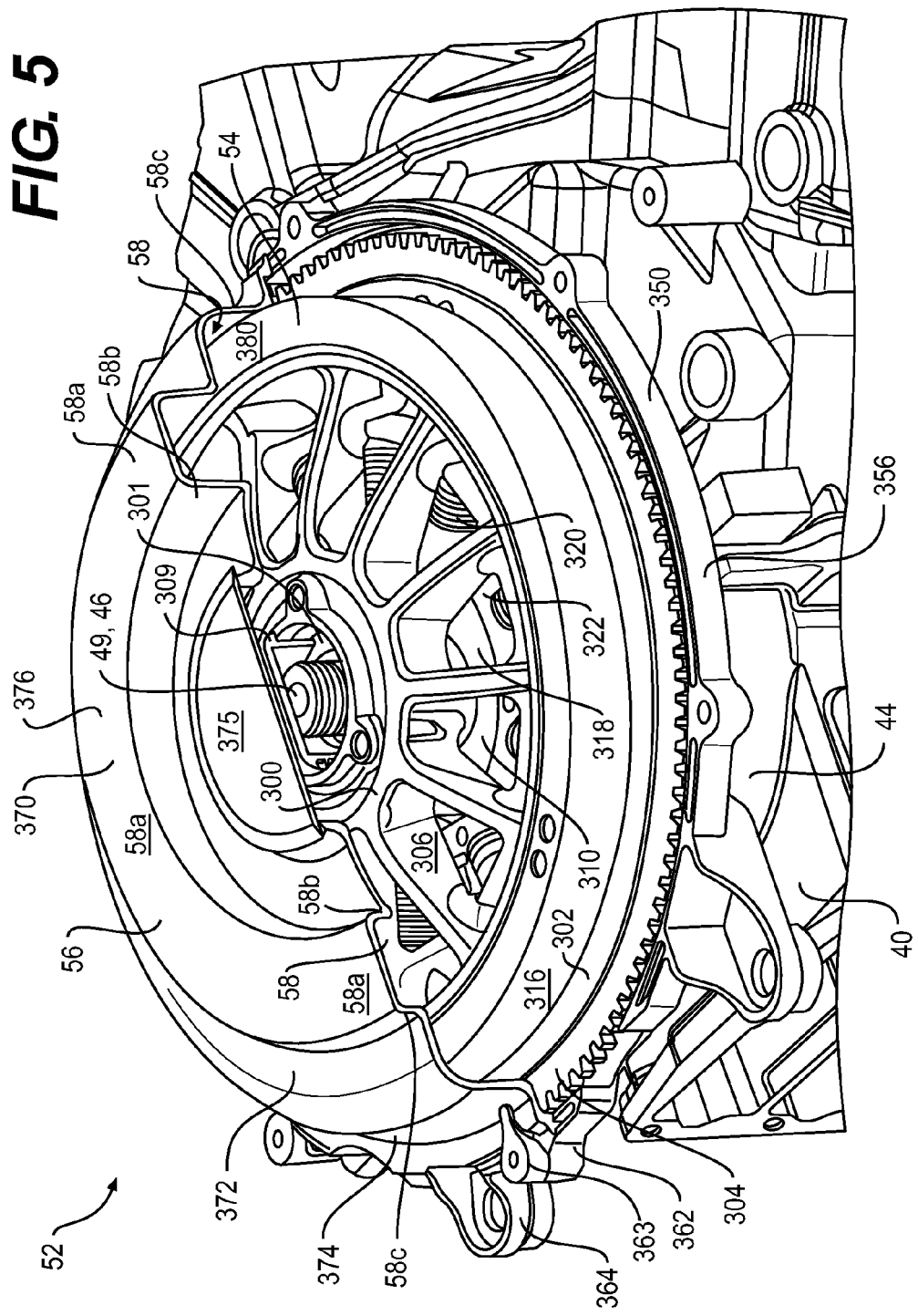

FLYWHEEL ASSEMBLY FOR AN OUTBOARD ENGINE

CROSS-REFERENCE

The present application claims priority to U.S. Provisional Patent Application No. 61/830,041 filed on May 31, 2013, the entirety of which is incorporated herein by reference.

TECHNOLOGICAL FIELD

The present technology relates to outboard engines and more specifically, to flywheel assemblies for outboard engines.

BACKGROUND

An outboard engine includes an internal combustion engine and a cowling covering the engine and other components of the power head so as to prevent them from being damaged by water, salt, wind and other such exterior elements.

A flywheel is typically mounted to an end of the crankshaft of the outboard engine to help maintain a constant angular velocity between engine firings. The flywheel also helps to start the engine. For both rope-pull engines and those with electric starters, the momentum of the flywheel smoothes out the force required to overcome compression within the cylinders in order to force the crankshaft to turn and thereby commence operation of the engine.

The outboard engine also includes a generator for generating electrical energy for operation of various electrically powered sub-systems. The generator is typically an alternator comprising a rotor and a stator, and more specifically a magneto comprising a plurality of permanent magnets. The rotor is typically attached to the flywheel. The stator, which includes a plurality of coils, is bolted to the engine block. The rotation of the rotor induces a current in the stator coils, which is used to charge the batteries and to power the various sub-systems.

The fresh air drawn into the cowling typically flows through the engine compartment, from a cowling inlet to a throttle body, before entering the combustion the engine's chambers. The rapidly rotating flywheel mounted atop the engine generates a significant amount of air turbulence within the engine compartment, which results in a more chaotic air flow from cowling inlet to throttle body, which in turn results in increased heat transfer from the engine to the air. In addition, the stator coils generate a considerable amount of heat which further increases the temperature of the air in the engine compartment. Heat transfer to the air within the engine compartment can have a negative impact on engine performance as the hotter the air drawn into the engine for the combustion process, the lower the efficiency and power output of the engine. It is thus desirable to minimize this heating of air in the engine compartment before entering the engine.

SUMMARY

It is an object of the present technology to ameliorate at least some of the inconveniences present in the prior art.

In one aspect, the present provides an outboard engine for propelling a watercraft. The outboard engine has a cowling defining an engine compartment and an engine compartment outlet fluidly communicating with the engine compartment. An engine is housed in the engine compartment. The engine includes an engine block. An output shaft, housed in part in the engine block, defines an output shaft axis, an axial direction, a radial direction and a circumferential direction. An outer end of the output shaft extends outside the engine block. A flywheel is mounted to the outer end of the output shaft to rotate therewith. A flywheel cover, fixed with respect to the engine block, defines a chamber housing the flywheel. The flywheel is disposed between the engine block and the flywheel cover in the axial direction. The flywheel is disposed between the output shaft and the flywheel cover in the radial direction. A channel member is connected to the flywheel cover. The channel member defines a channel extending between a first end and a second end. The second end fluidly communicates with the engine compartment outlet. At least a portion of the channel extending in a circumferential direction is continuous with the chamber. The channel member defines a cross-sectional area of the channel. The cross-sectional area of the circumferentially-extending portion increases towards the second end.

In another aspect, the flywheel is disposed between the channel and the engine block in the axial direction.

In another aspect, the circumferentially extending portion of the channel is continuous with the chamber in the axial direction.

In yet another aspect, the channel member defines a height of the channel in the axial direction. An axial direction height of the circumferentially extending portion increases towards the second end.

In a further aspect, a portion of the flywheel is disposed further outward than the channel in the radial direction.

In an additional aspect, the flywheel cover includes a lower portion disposed between the flywheel and the engine block in the axial direction.

In an additional aspect, a connector is attached to the flywheel cover and the cowling. The connector defines a passage fluidly communicating the second end of the channel with the engine compartment outlet for directing air flowing through the channel out of the engine compartment.

In a further aspect, the connector is removably attached to the flywheel cover.

In another aspect, the channel member is integrally formed with the flywheel cover.

In another aspect, a generator is disposed at least in part in the chamber. The magneto includes a rotor mounted to the output shaft to rotate therewith, and a stator connected to the engine block. The stator is concentric with the output shaft. At least a portion of the stator is disposed between the flywheel cover and the output shaft in the radial direction.

In another aspect, the rotor is mounted to the flywheel.

In a further aspect, the stator is disposed between the flywheel and the engine block in the axial direction.

In a further aspect, the stator is disposed radially inwardly compared to the channel.

In an additional aspect, the flywheel cover includes a lower portion disposed between the flywheel and the engine block in the axial direction. At least a portion of the stator is disposed between the lower portion and the output shaft in the radial direction.

In an additional aspect, an air gap extends in the radial direction between the stator and at least one of: the lower portion of the flywheel cover and the output shaft.

In another aspect, the present provides a cover for a flywheel mounted to an output shaft of an engine. The cover includes a first portion and a second portion connected to the first portion. A chamber is defined at least in part between the first and second portions for housing the flywheel. An opening in the second portion is adapted to receive the output shaft therethrough. An outlet fluidly communicates with the chamber. The outlet is defined by the first portion and adapted to direct air away from the chamber.

In a further aspect, the engine compartment outlet is disposed at least in part longitudinally forward of the output shaft axis.

In another aspect, the present provides a cover for a flywheel mounted to an output shaft of an engine. The output shaft defines an output shaft axis. The cover includes an end portion and a side portion connected to the end portion. A chamber for housing the flywheel is defined at least in part by the end and side portions. A channel member is connected to at least one of the end and side portions. The channel member defines a channel extending between a first end and a second end. The second end is adapted to direct air flowing through the channel away from chamber. At least a portion of the channel extending in a circumferential direction with respect to the output shaft axis is continuous with the chamber. The channel member defines a cross-sectional area of the channel. The cross-sectional area of the circumferentially-extending portion increases towards the second end.

In a further aspect, the circumferentially extending portion of the channel is continuous with the chamber in a direction parallel to the direction of the output shaft axis.

In an additional aspect, the cover has a third portion. The chamber is disposed at least in part between the first and third portions in a direction parallel to the direction of the output shaft axis.

In a further aspect, the channel member is adapted to be attached to the engine, and the channel outlet is adapted to connect to an outlet of the engine for directing air flowing through the channel out of the outboard engine.

In another aspect, the channel member is integrally formed with at least one of the first and second portions.

For purposes of the present application, terms related to spatial orientation when referring to an outboard engine and components in relation to the outboard engine, such as "forwardly", "rearwardly", "left", "right", "above" and "below", are as they would be understood by a driver of a boat to which the outboard engine is connected, with the outboard engine connected to the stern of the boat, in a straight ahead orientation (i.e. not steered to port or starboard), and in an upright position (i.e. not tilted and not trimmed). Also, for the purposes of the present application, unless specified otherwise, the terms "axial direction", "radial direction", and "circumferential direction" are with respect to the crankshaft axis of the outboard engine.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 is a close-up perspective view, taken from a front, left side of a portion of the power head of FIG. 4B showing the flywheel assembly mounted on the engine block with the flywheel cover partially cut-away to show a flywheel and an magneto mounted therebelow;

DETAILED DESCRIPTION

The description will refer to flywheel assemblies and flywheel covers for outboard engines used to propel watercraft. However, it is contemplated that some aspects of the flywheel assemblies and covers could be adapted for use on an inboard engine.

Figure 1:
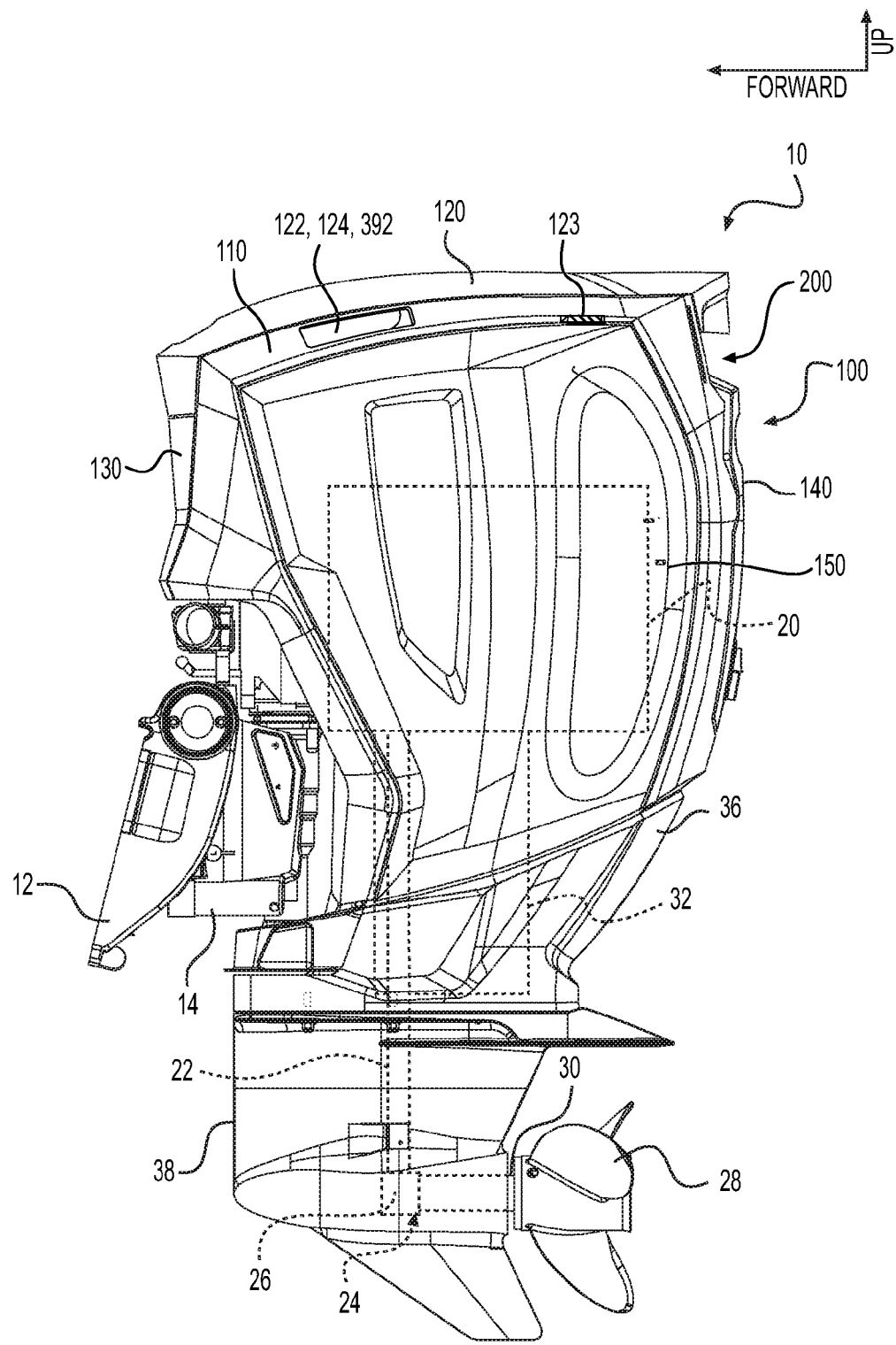
FIG. 1 is a left side elevation view of an outboard engine.
Figure 2A:
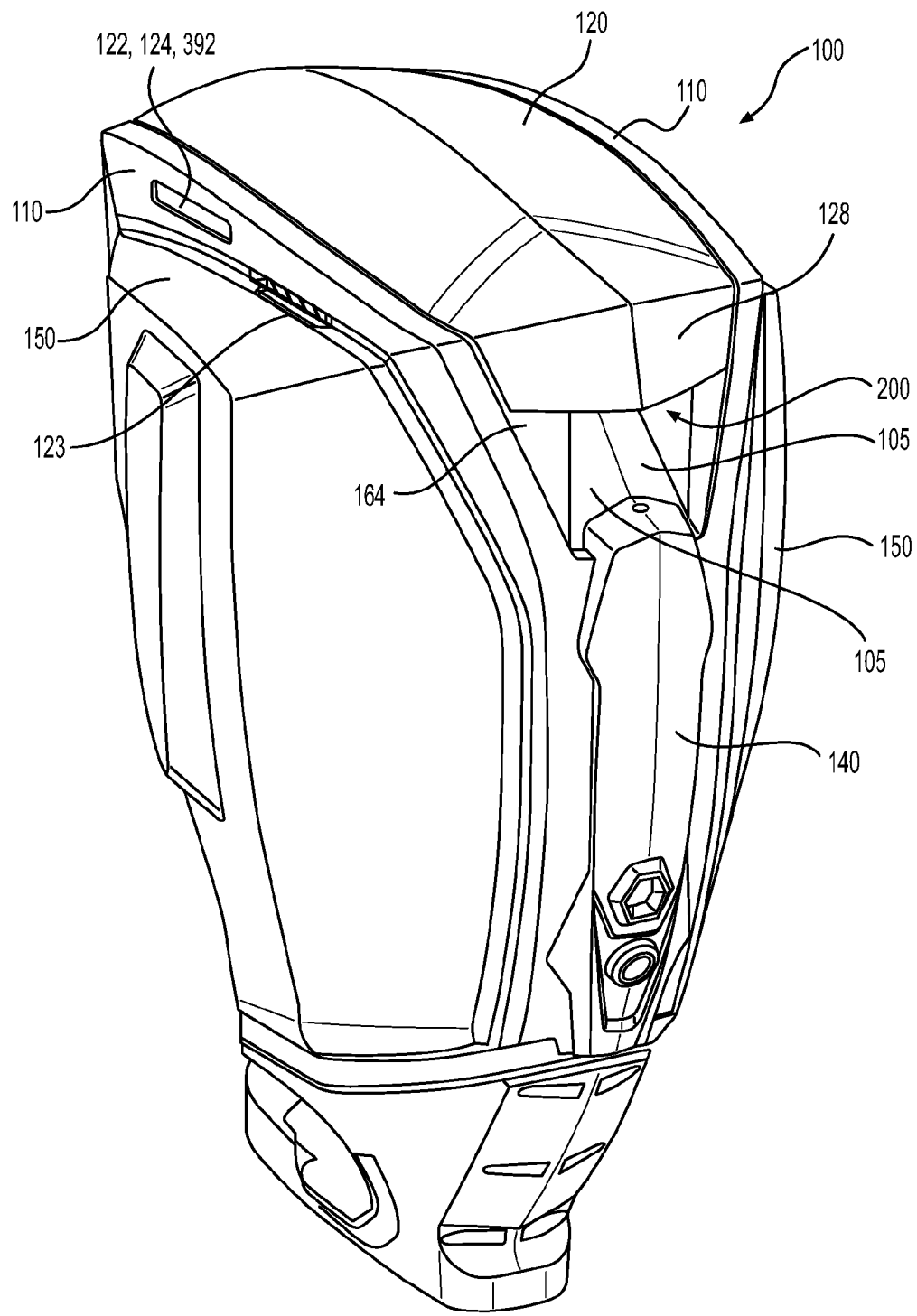
FIG. 2A is a perspective view, taken from a rear left side, of a cowling of the outboard engine of FIG. 1.
Figure 2B:
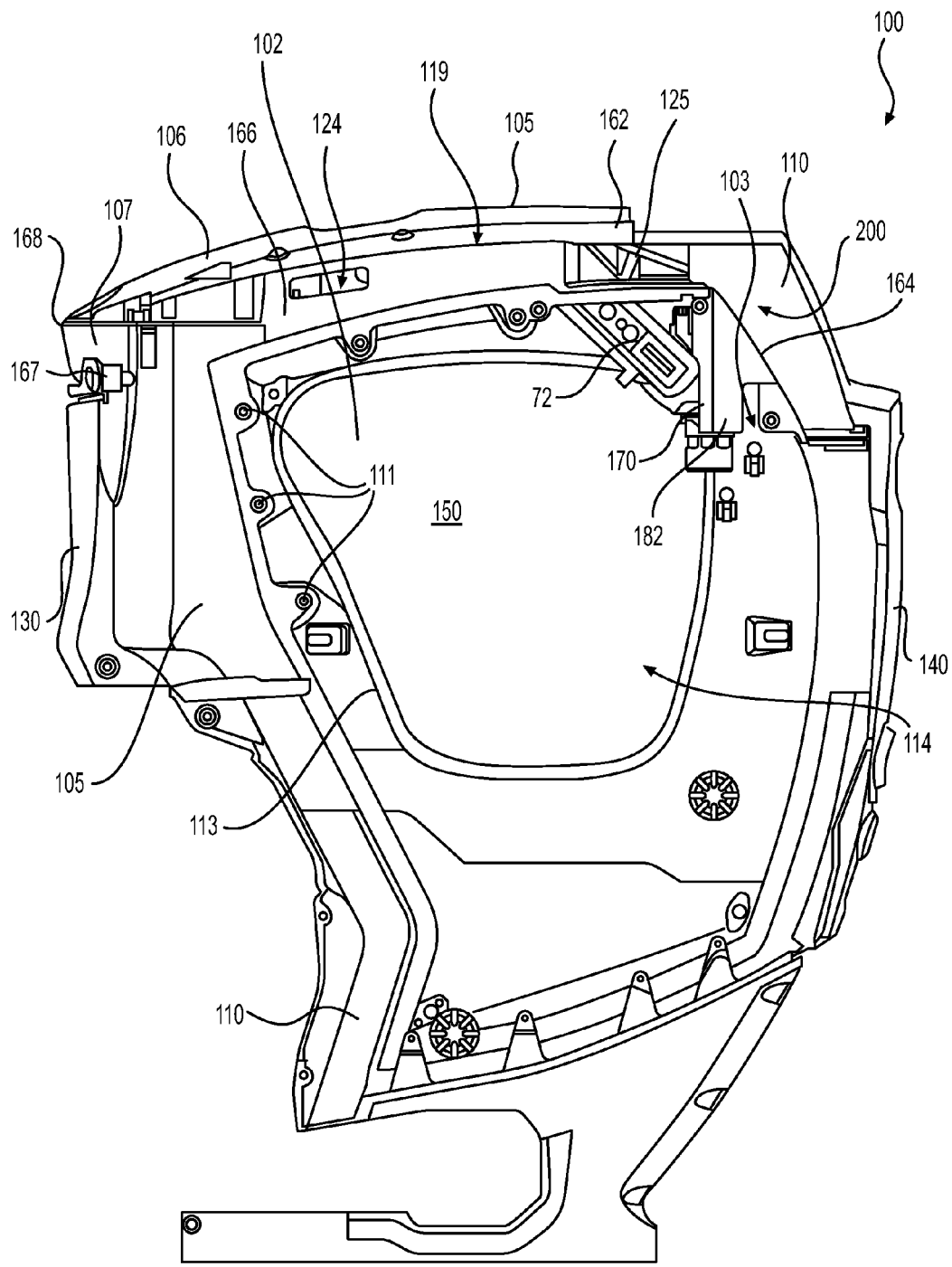
FIG. 2B is a left side elevation view of the cowling of the outboard engine of FIG. 1 with a left side cover and a top cover removed.
Figure 3:
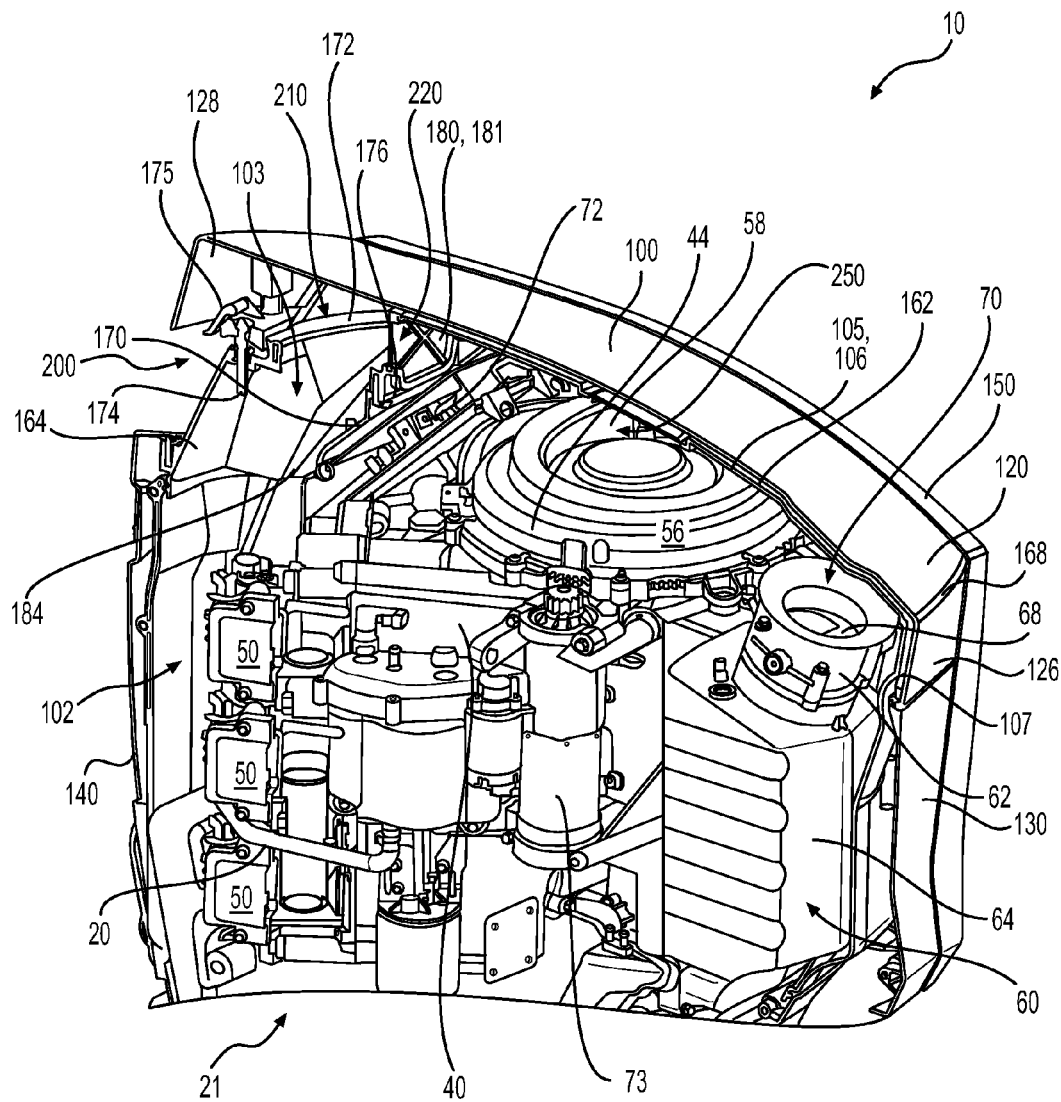
FIG. 3 is a partially cut-away perspective view, taken from a front, right side of a portion of the outboard engine of FIG. 1 with the right side of the cowling being cut away to show a power head, including an engine and a flywheel assembly, housed inside the engine compartment formed by the cowling.

With reference to FIGS. 1 to 3, an outboard engine 10 has a cowling 100 protecting an engine 20 (shown schematically in FIG. 1) and other components connected to the engine 20. The engine 20 and related components connected thereto are collectively referred to herein as a power head 21 (shown in FIGS. 3 to 4B).

The engine 20 is housed in an engine compartment 102 (FIG. 2A) formed by the cowling 100. The engine 20 is a direct injection, two-stroke, V-type, six-cylinder internal combustion engine. It is contemplated that other types of engines could be used, such as, but not limited to, carbureted engines, semi-direct injection engines, or four-stroke engines.

As can be seen in FIG. 1, the outboard engine 10 is mounted to a transom of a boat by a mounting bracket, including a stern bracket 12 and a swivel bracket 14. The swivel bracket 14 connects the stern bracket 12 to the cowling 100, and the stern bracket 12 mounts the outboard engine 10 to the transom. The swivel bracket 14 partly houses a steering shaft (not shown) of the outboard engine 10. The brackets 12, 14 can take various forms, the details of which are conventionally known and will therefore not be discussed further herein.

The engine 20 is coupled to a vertically oriented driveshaft 22 (shown schematically). The driveshaft 22 is coupled to a drive mechanism 24 (shown schematically), which includes a transmission 26 (shown schematically) and a bladed rotor, such as a propeller 28 mounted on a propeller shaft 30. The propeller shaft 30 is generally perpendicular to the driveshaft 22, but could be at other angles. The drive mechanism 24 could also include a jet propulsion device, turbine or other known propelling device. The bladed rotor could also be an impeller. The drive mechanism 24 and a portion of the propeller shaft are housed within a gear case 38 of the outboard engine 10.

An exhaust system 32 including an exhaust manifold 34, is connected to the engine 20. The exhaust system 32 is surrounded by the cowling 100. A lower portion of the exhaust system 32 is housed in a midsection 36 below the cowling 100 and above the gear case 38.

Figure 4A:
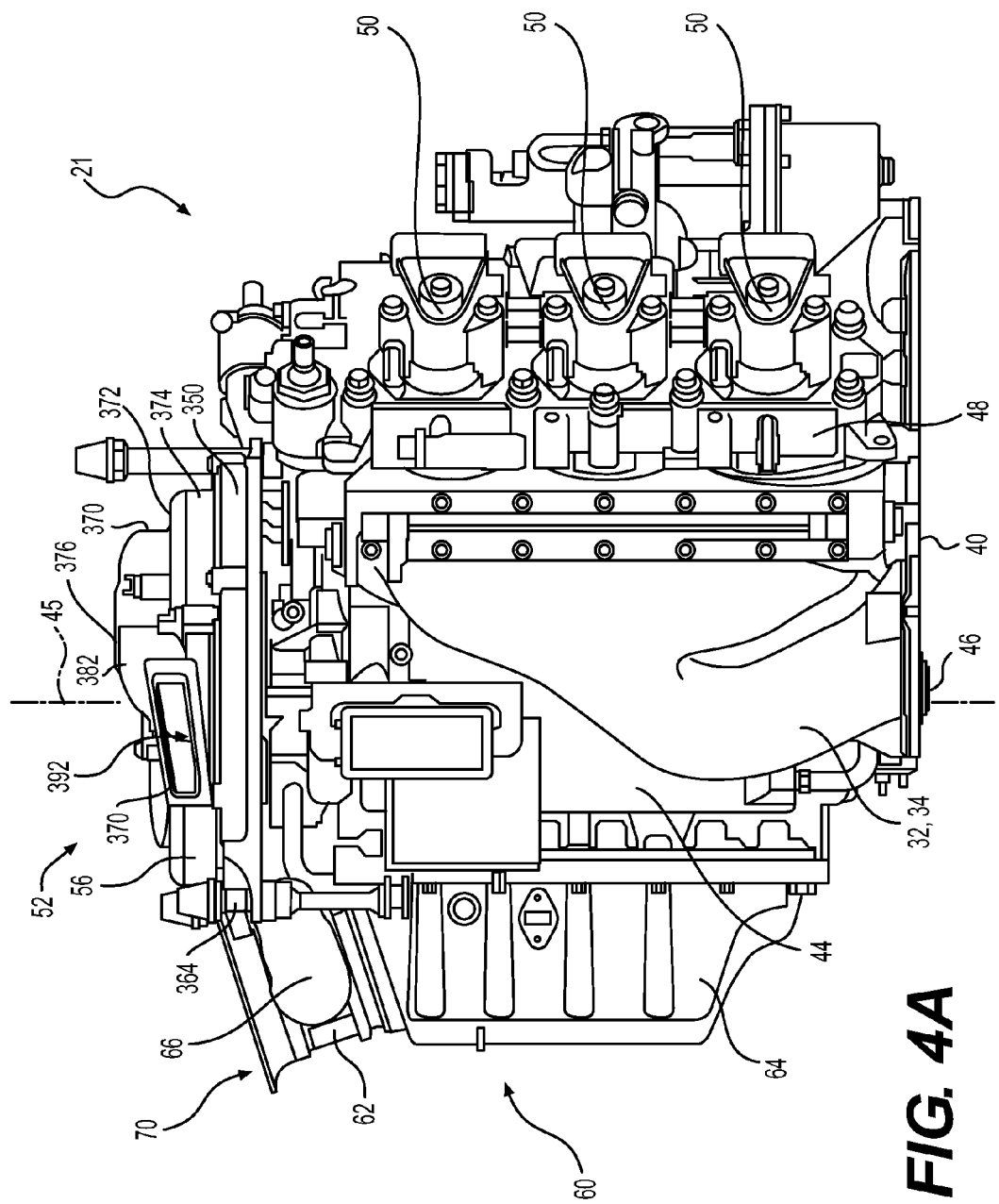
FIG. 4A is a left side elevation view of the power head of FIG. 3.
Figure 4B:
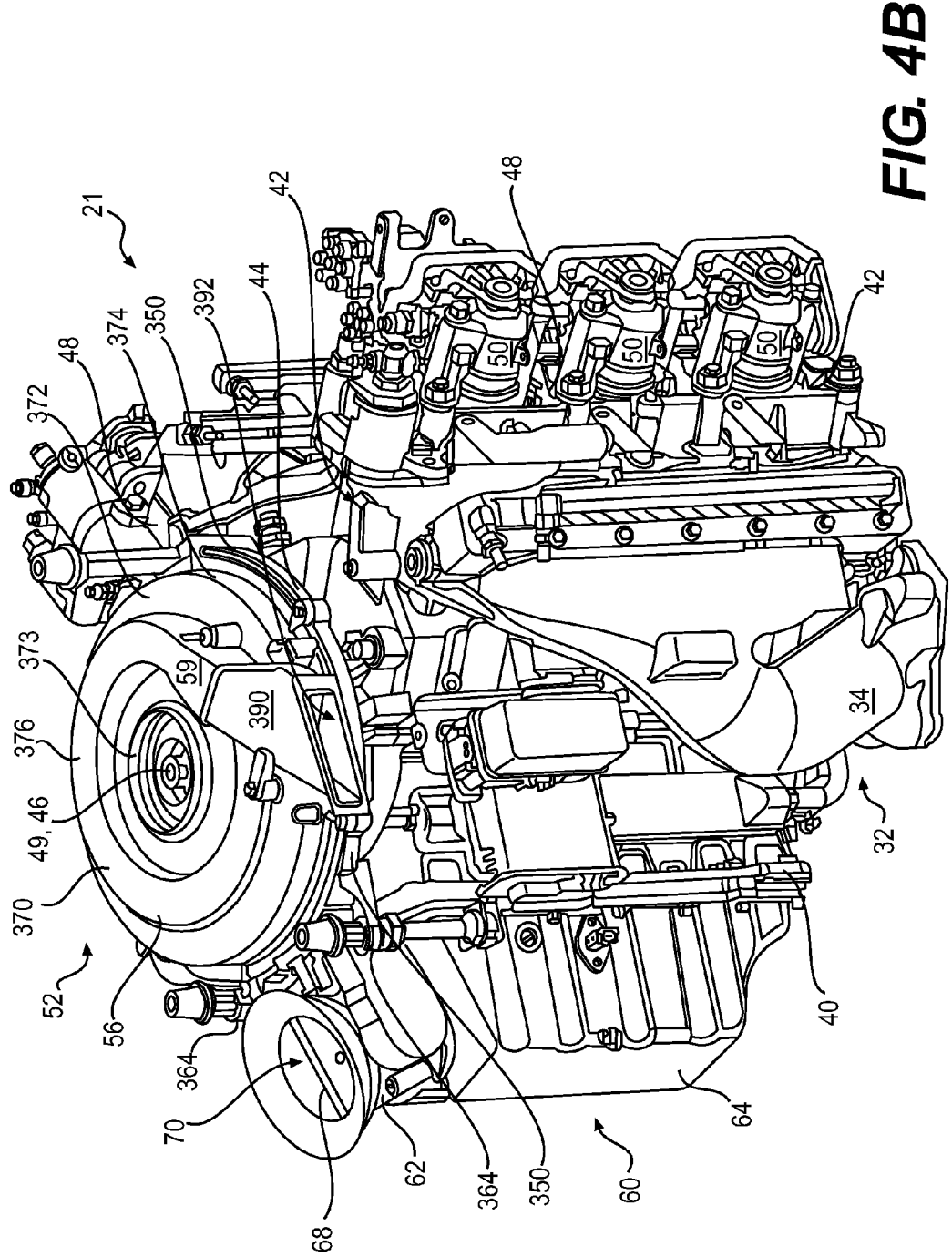
FIG. 4B is a perspective view taken from a front, left side of the power head of FIG. 3.
Figure 6:
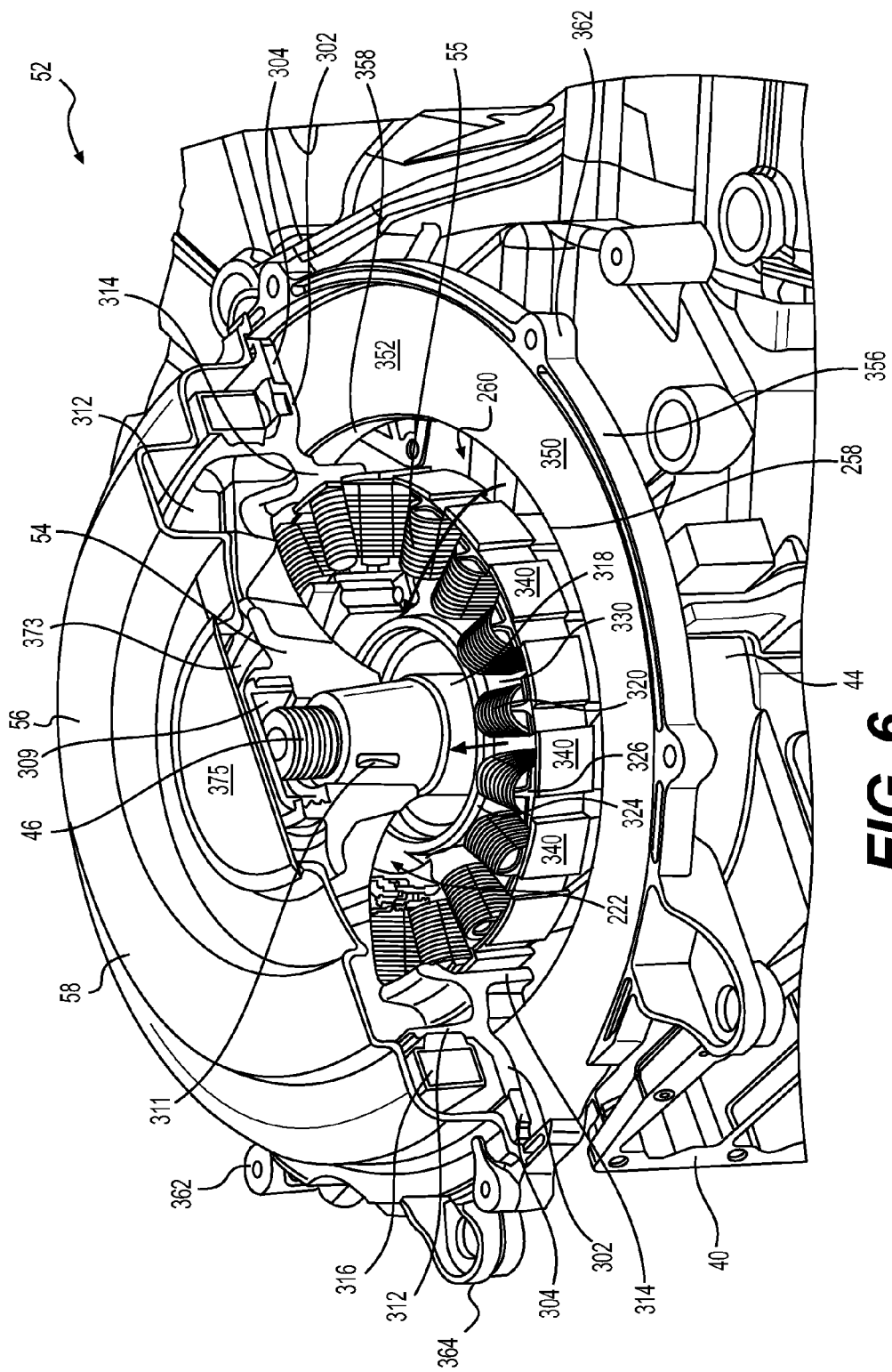
FIG. 6 is a close-up perspective view, taken from a front, left side of the portion of the power head of FIG. 5 with the flywheel cover and the flywheel being partially cut-away to show a stator of the magneto mounted therebelow.
Figure 7:
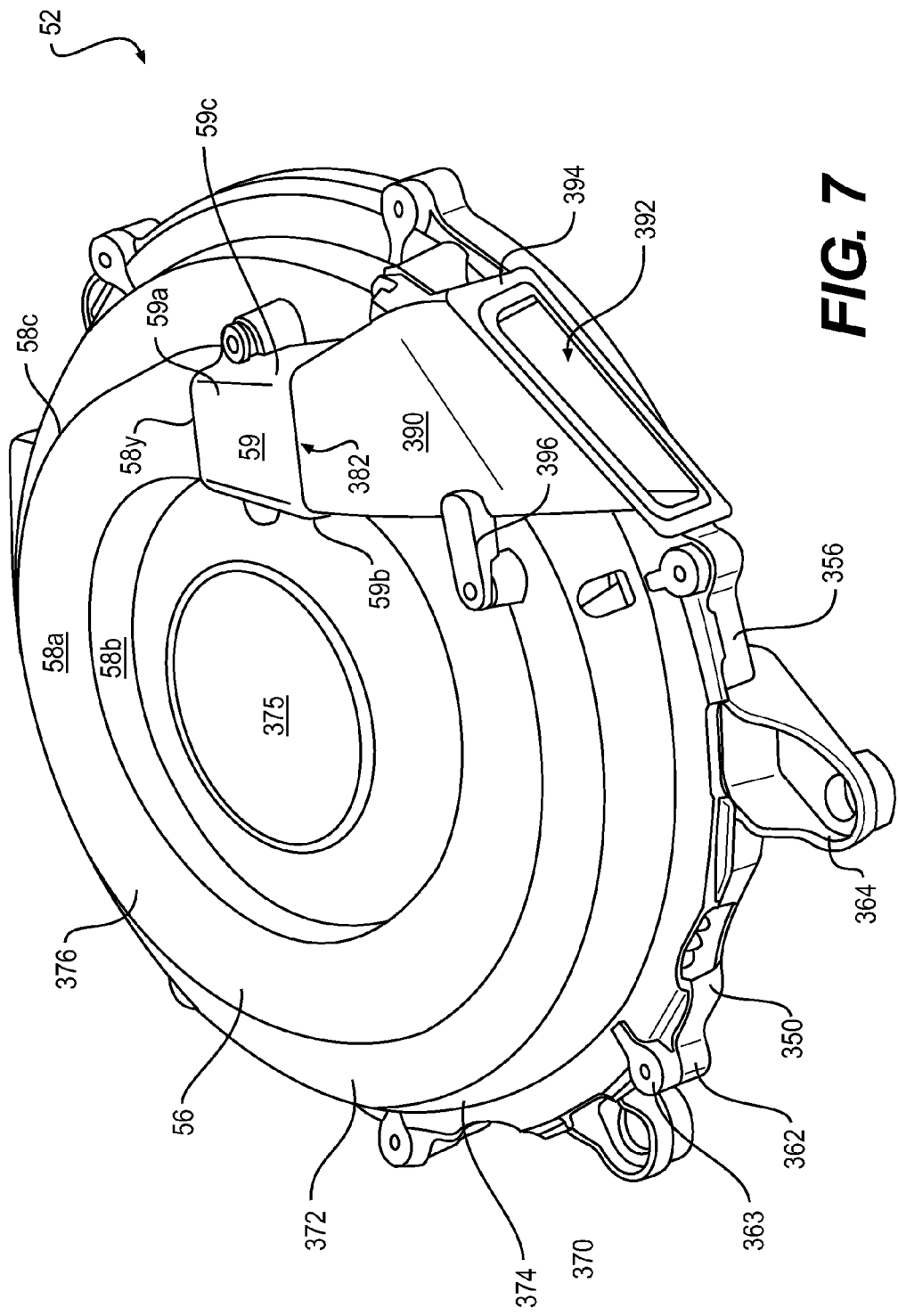
FIG. 7 is a perspective view, taken from a top, front, left side of the flywheel assembly of FIG. 5 shown in isolation.

With reference to FIGS. 4A and 4B, the engine 20 has a cylinder block 40 with two banks of three cylinders 42 arranged to form a V. It is contemplated that the cylinder block 40 could have more or less than six cylinders 42. It is also contemplated that the cylinders 42 could have a configuration other than a V-formation. For example, the cylinders 42 could be arranged inline, in which case the engine would be an inline-type engine.

The cylinder block 40 has a crankcase 44 connected to all six cylinders 42. A crankshaft 46, having a crankshaft axis 45 is rotatably disposed inside the crankcase 44. The bottom end of the crankshaft 46 extends out through a bottom wall of the crankcase 44 to be operatively connected to the driveshaft 22.

The three cylinders 42 of the right bank extend on the rear, right side of the crankcase 44. Similarly, the three cylinders 42 of the left bank of the V-formation extend on the rear, left side of the crankcase 44. The front portion of each cylinder 42 is connected to the crankcase 44. A piston (not shown) is disposed inside each cylinder 12 to reciprocate therein along a reciprocation axis that is coaxial with the cylindrical axis of the cylinder 42. Each piston is connected to the crankshaft 46 via a connecting rod (not shown) to drive the crankshaft 46. The rear end of the cylinders 42 of each bank is closed by a cylinder head 48 disposed thereon. Combustion chambers (not shown) are defined between the walls of the cylinder 42, the pistons and the cylinder heads 48. Fuel injectors 50, connected to the cylinders 42 by the cylinder heads 48, supply fuel to the combustion chambers. Spark plugs (not shown) connected to the cylinder heads 48 ignites the fuel-air mixture in the combustion chambers.

An exhaust manifold 34 is disposed on the left side of each bank of cylinders 42. Each cylinder 42 connects to its respective exhaust manifold 34 on its left side to expel exhaust gases resulting from the combustion process occurring in the cylinder 42.

An air intake system 60, including a throttle body 62 and a plenum 64, is connected to the crankcase 44 to supply air for the combustion process. The throttle body 62 has a throttle valve 68 (FIG. 4B) and a throttle body inlet 70. Air enters via the throttle body inlet 70 into the throttle body 62. The throttle valve 68 regulates the amount of air flowing through the throttle body 62 into the plenum 64 and eventually into the combustion chamber of each cylinder 42. The throttle valve 68 is a butterfly valve comprising a circular disc mounted inside the tubular throttle body 62 that rotates about a rod passing through a diameter of the disc. The passage of air through the tubular throttle body 62 is obstructed by varying amounts as the disc rotates about the rod. A throttle valve actuator 66, in the form of an electric motor, is operatively connected to the throttle valve 68 to rotate the circular disc and thereby adjust the opening of the throttle valve 68. In the illustrated embodiment, the throttle valve 68 is controlled electronically by an electric actuator, but it is contemplated that the throttle valve 68 could be mechanically actuated by a mechanical linkage.

Air flows through the throttle valve 68 in the throttle body 62 into the plenum 64 which helps to equalize pressure of the air flowing therethrough into the crankcase 44. Reed valves (not shown) are placed in intake passages (not shown) connecting the plenum 64 to each chamber of the crankcase 44 to prevent backflow of air into the plenum 64. Air flows from the crankcase 44 via the passages in the cylinder 42 to the combustion chamber of each cylinder 42.

A flywheel 54 (FIG. 5) is located at the top end of the crankcase 44 and connected directly to the top end of the crankshaft 46 of the engine 20. The mass of the flywheel facilitates smooth operation of the engine by helping maintain constant angular velocity between engine firings, and can also act as a pull-start system for manually starting the engine 20 in some embodiments. A cover 56 is placed over the rotating flywheel. A channel 58 formed in the cover 56 guides turbulent air from around the flywheel 54 out of the engine compartment 102.

An engine control unit (ECU) 72 (seen in FIGS. 2B and 3) is operatively connected to the engine 20 to control operation of the engine 20. The ECU 72 is in electronic communication with various sensors from which it receives signals. The ECU 72 uses these signals to control the operation of the throttle valve actuator, the ignition system (not shown), and the fuel injectors 50 in order to control the engine 20.

The configuration of the engine 20 and other components of the power head 21, as described above, is intended to be exemplary. It is contemplated that the engine 20 could be configured differently. For example, the engine 20 could have more or less than six cylinders 42, the cylinders 42 could be arranged inline or at a different angle than as shown herein. A single exhaust manifold 34 could be connected to all the cylinders 42 instead of two manifolds 34 as shown. A throttle body 62 could be connected directly to each cylinder 42 instead of through the crankcase 44.

The outboard engine 10 also has other components housed within the engine compartment 102, such as an oil filter, an oil pump, spark plugs and the like. As it is believed that these components would be readily recognized by one of ordinary skill in the art, further explanation and description of these components will not be provided herein.

As can be seen in FIG. 3, the cowling 100 extends from above the flywheel cover 56 at the top of the engine 20 to a point vertically below the crankcase 44. It is contemplated that the cowling 100 could extend above or below the point vertically below the middle of the swivel bracket 14. The cowling 100 includes a support structure 105 (FIG. 2B) and a plurality of panels 120, 130, 140, 150 (FIGS. 1 to 3).

The engine 20 is connected to the support structure 105. The support structure 105 extends across portions of the front, the top and the back of the engine 20. A bottom of the support structure 105 is open, and connects to the exhaust system 32. It is contemplated that the support structure 105 could (instead or in addition) be fixed to the swivel bracket and/or the exhaust system 32. While it is possible to disconnect the support structure 105 from the engine 20, the support structure 105 stays fixed to the engine 20 during routine use.

The panels 120, 130, 140, 150 are removably connected to the support structure 105. The panels 120, 130, 140, 150 are a top cover or cap 120, a front cover 130, a rear (or back) cover 140, a left side panel 150 and a right side panel 150. The panels 120, 130, 140, 150 are connected to an exterior of the support structure 105. The support structure 105 supports the panels 120, 130, 140, 150 and connects them to the engine 20. The panels 120, 130, 140, 150 with portions of the support structure 105 form an outer surface of the cowling 100. The panels 120, 130, 140, 150 enclose or otherwise cover the engine 20. The panels 120 and 150 provide access to different parts of the engine 20 when removed.

The support structure 105 is made of plastic. It is contemplated that the support structure 105 could be made of metal, of composite material or of a combination of various materials. The panels 120, 130, 140, 150 are each a single molded piece made of the same plastic as the support structure 105. It is contemplated that the panels 120, 130, 140, 150 could be made of a material other than the one of the support structure 105 and other than a plastic.

As can be seen in FIGS. 2B and 3, the support structure 105 includes a central upper portion 106 and a central front portion 107 connected thereto. The support structure 105 also includes a left (port) structural panel 110 and a right (starboard) structural panel 110 connected to the central upper and front portions 106, 107.

The central upper portion 106 of the support structure 105 includes a top wall 162 extending across the top of the engine 20 and a rear wall 164 extending along an upper portion rearward of the engine 20. The rear wall 164, spaced from the top wall 162, slopes downwardly and rearwardly away from the top wall 162. A wall 176 extends downwards from the rear end of the top wall 162. A baffle 170 (best seen in FIG. 3) extends downwards from the wall 176. A left side wall 166 (FIG. 2B) of the central upper section 106 extends from the top wall 162 downwards along the left side of the engine 20 and a corresponding right side wall (not shown) extends downwards along the right side of the top wall 162. The rear portion of the side wall 166 slopes downwards and rearwards behind the top wall 162 to the bottom end 184 of the rear wall 164.

The central front portion 107 (FIG. 2B) of the support structure 105 extends downwards from the front end 168 of the top wall 162 and forward of the engine 20. The lower portion of the left and right sides of the central front portion 107 are also attached to the corresponding left and right structural panels 110 by bolts 111 (FIG. 2B).

A main air inlet 200 is defined between the top cap 120 and the rear wall 164 of the central upper portion 106 as can be seen best in FIGS. 2A and 3. An outer chamber 103 is defined between the rear wall 164, the vertical wall 176 and the baffle 170. Air from outside the outboard engine 10 enters the outer chamber 103 via the main air inlet 200.

With reference to FIG. 3, an air inlet 210 is formed in the space between the vertically extending wall 176 and the rear wall 164. Another air inlet 220 having a hydrophobic mesh disposed thereacross is defined in the vertically extending wall 176. The inlets 210, 220 fluidly communicate the outer chamber 103 with the engine compartment 102. The inlets 210, 220 remain open during operation of the engine 20 so that air can flow into the engine compartment 102 for operation of the engine 20.

With reference to FIG. 2B, air can also enter the outer chamber 103 via left and right apertures 125 formed in respective side walls 166, rearward of the rear end of the top wall 162 and the vertically extending wall 176. The apertures 125 fluidly connect to the main air inlet 200. The side air inlets 125 can also be used to evacuate water that enters the outer chamber 103 via the main inlet 200, for example when operating the outboard engine 10 in reverse. Water that enters the cowling 100 through the main inlet 200 can flow out of the outer chamber 103 and out of the outboard engine 10 via the apertures 125.

With reference to FIG. 2B, a rectangular aperture 124 is disposed in the front portion of the left side wall 166 for expelling air from the engine compartment 102. The aperture 124 connects to the outlet 392 of a connection tube 390 (FIG. 4A) attached to the flywheel cover 56 of a flywheel assembly 52 as will be discussed below in further detail. In the illustrated embodiment, the left structural panel 110 has an aperture 122 (FIGS. 1 and 2A) corresponding to the aperture 124 of the left side wall 166. The connection tube 390 extends through the side wall aperture 124 to the structural panel aperture 122 to directly expel air outside on a left side of the outboard engine 10. In an alternate embodiment, the side walls 166 are spaced from the left and right structural panels 110 placed thereover. Air expelled through the aperture 124 flows rearward along the space between the left structural panel 110 and the left side wall 166 to be expelled outside rearward of the outboard engine 10.

With reference to FIGS. 1 to 2B, the left structural panel 110 extends generally across the left side of the engine 20. The left structural panel 110 forms a left lateral side aperture 114 that reveals portions of the left side of the engine 20. The left structural panel 110 extends from the top left edge of the central upper portion 106 to a point below the engine 20. Similarly, the right structural panel 110 extends from the top right edge of the central upper portion 106 downward to a point below the engine 20 and defines a right lateral aperture 114 that reveals portions of the engine 20 and power head 21. The left and right structural panels 110 are mirror images of one another. As such only the left structural panel 110 will be described below for simplicity. The left structural panel 110 also extends forwardly as well as rearwardly of a portion of the left side of the engine 20 and power head 21. The portions of the engine 20 revealed by the left lateral side aperture 114 are selectively covered by the left side panel 150. It is contemplated that the left structural panel 110 could have none or more than one lateral side aperture 114 and that more than one side panel 150 could cover these lateral side apertures 114. The left and right structural panels 110 are bolted to each other at various connection points in the front and the back. It is contemplated that the structural panels 110 could be secured to each other, other than by bolts, and that a seal could be disposed along the connection seam between the structural panels 110.

It is contemplated that the support structure 105 could be configured differently than as shown. For example, the support structure 105 could be one or more beams or trusses which extend across and at least partially surround the engine 20 without covering it, and external panels could connect to the beams such that they cover both the engine 20 and the beams or trusses.

With reference to FIGS. 1 to 2B, the left and right side covers 150 are minor images of one another and only the left side cover 150 will be described below for simplicity. The left side cover 150, friction fitted to the left structural panel 110, covers the left lateral side aperture 114. The left side cover 150 is slightly curved outwardly to accommodate a shape of the engine 20. A water tight connection between the left structural panel 110 and the left side cover 150 is ensured by a seal disposed on the left side cover 150 and adapted to contact with a rim 113 of the left lateral side aperture 114. The left side cover 150 is larger than the left lateral aperture 114 so as to cover a portion of the left structural panel 110 and provide an additional barrier to water leaking into the engine compartment 102. The left and right side covers 150 may be removed to access the engine 20 for maintenance and/or servicing. It is contemplated that the left and right side covers 150 could not be mirror images of one another.

With reference to FIGS. 1 and 2A, an opening 123 is defined at the connection between each structural panel 110 and the corresponding side cover 110. The opening 123 is aligned with the aperture 125 on the side walls 166 of the central upper portion 106. Air from outside the outboard engine 10 flows into the inlet 125 via the opening 123.

With reference to FIGS. 1 and 2A, the top cover or cap 120 is an elongated panel extending from the front of the support structure 105 to the back of the support structure 105. The top cover 130 covers a servicing area 119 (FIG. 2B) of the central upper portion 106 that includes the cap 121. The top cover 120 is removably attached to the support structure 105. With reference to FIG. 3, a latch 175 on the inner surface of the top cover 120 just forward of the rear flange 128 engages a post 174 of the rear wall 164 of the upper central portion 106 to removably attach the top cover 120 to the support structure 105.

With reference to FIGS. 2B and 3, the front cover 130 is attached to the front central portion 107 and each of the left and right structural panels 110. The front flange 126 of the top cover 120 is then attached over the front cover 130 by a pair of friction pins 167 (the left one can be seen in FIG. 2B). The front cover 130 is generally not removed except during initial rigging of the outboard engine 10.

With reference to FIGS. 1 to 3, the back cover 140 covers a rear portion of the vertical connection seam between the structural panels 110 so as to provide an additional barrier to water and external elements. The upper end of the back cover 140 is disposed above the bottom of the central portion 106. The lower rear ends of the structural panels 110 extend below the lower end of the back cover 140. The upper end of the back cover 140 is bolted to the rear wall 164 of the upper central portion 106 and the lower end of the back cover 140 is clipped to the structural panels 110.

It is contemplated that any of the covers 120, 130, 140, 150 could have a shape and/or size that is different from that shown in the Figures. For example, the side covers 150 could be curved so as to accommodate portions of the engine 20 protruding through the lateral side apertures 114. As another example, the side covers 150 could be of the size of their corresponding lateral side aperture 114. It is contemplated that a seal could be disposed between any of the covers 120, 130, 140, 150 and the support structure 105. It is contemplated that the covers 120, 130, 140, 150 could be connected to the support structure 105 by means other than as shown herein. For example, the front cover 130 and the back cover 140 could be hinged or friction fitted to the support structure 105.

It is also contemplated that some or all of the panels 120, 130, 140, 150 could themselves support other panels. It is contemplated that some or all of the panels 120, 130, 140, 150 could not be removable from support structure 105, but be only partially selectively connected to the support structure 105, by for example by a hinged connection. It is contemplated that the cowling 100 could comprise more or less than the panels 120, 130, 140, 150, and that some of the panels 120, 130, 140, 150 could not be external panels of the cowling 100.

The various panels and walls of cowling 100, as described above, define the engine compartment 102. The engine compartment 102 therefore has an upper portion disposed adjacent the top wall 162, rearward of the central front portion 107, and forward of the baffle 170. The left and right structural panels 110 and the left and right side covers 150 define the lateral sides of the engine compartment upper portion 102. A middle portion of the engine compartment 102 is defined by the central front portion 107, the left and right structural panels 110, the left and right side covers 150, and the rear wall 164 of the central upper portion 106. In the lower portion, the engine compartment 102 is defined by the left and right structural panels 110 which are connected to each other forward and rearward of the engine 20.

The flywheel assembly 52 will now be described in more detail with reference to FIGS. 4A to 18. In the discussion below, the components of the flywheel assembly 52 are described with respect to their orientation when mounted to the crankshaft 46 on the engine block 40 of the outboard engine 10, and the terms "axial direction", "radial direction", and "circumferential direction are defined with respect to the crankshaft axis 45 of the outboard engine 10.

The flywheel assembly 52 includes the flywheel 54, the magneto 55, and the flywheel cover 56. The magneto 55 includes a rotor 74 and a stator 76. The flywheel 54, the rotor 74, the stator 76 and the upper end of the crankshaft 46 are housed in a chamber 380 defined by the flywheel cover 56.

The flywheel 54 has a central annular hub 300, an outer rim 302, a ring gear 304, and twelve spokes 306 connecting between the hub 300 to the outer rim 302. It is contemplated that the flywheel 54 could have more or less than twelve spokes 306.

The flywheel has an inner ring 314 concentric with the hub 300 and disposed radially inwardly of the outer rim 302. The inner ring 314 extends above and below the outer rim 302. An outer ring 312, concentric with the hub 300, is disposed radially outwardly of the inner ring 314 and radially inwardly of the outer rim 302. The outer ring 312 extends vertically upwards to a level higher than the outer rim 302 and the inner ring 314. The spokes 306 extend radially outwardly and downwardly from the hub 300 to the inner ring 314 and the outer ring 312. A gap 310 between consecutive spokes 306 extends from the hub 300 to the inner ring 314.

The ring gear 304 extends radially outwardly from the outer rim 302 of the flywheel 54. The ring gear 304 has a set of teeth that can be engaged by a starter motor 73 (shown in FIG. 3) in order to rotate the flywheel 54 as is known in the art. The radially inward surface of the ring gear 304 is received in a complementary groove of the outer rim 302. The ring gear 304 is rigidly attached to the outer rim 304, for example, by a press-fit or keyway. It is contemplated that the ring gear 304 could be formed integrally with the flywheel 54.

The crankshaft 46 is received in a central opening 301 of the annular hub 300. The diameter of the central opening 301 decreases continuously from its lower end towards its upper end in order to accommodate a crankshaft 46 that tapers towards its upper end 49. The crankshaft 46 and the flywheel 54 are connected by keys 311 (FIG. 6) held between inner surface of the hub 300 and the outer surface of the upper end 49 of the crankshaft 46. The flywheel 54 is thus coupled to the crankshaft 46 so as to rotate therewith about the crankshaft axis 45. A nut (not shown) is placed around the threaded upper end 49 of the crankshaft 46 extending above the opening 301 to prevent axial direction movement of the crankshaft 46. The upper end of the crankshaft and the nut placed thereon are covered by a cap 309 attached to the hub 300.

In the illustrated embodiment, the flywheel 54 is directly connected to the upper end 49 of the crankshaft 46 which forms the output shaft of the engine 20. It is however contemplated that the end 49 could be an end of an output shaft connected to the crankshaft 46 in which case the rotation axis of the flywheel 54 would be the central axis of the output shaft. It is contemplated that the output shaft could be coaxial with the crankshaft 46, in which case, the output shaft axis would be the crankshaft axis 45. It is also contemplated that the output shaft could be parallel to the crankshaft 46 in which case the rotation axis of the flywheel 54 would be the output shaft axis, which would not be the crankshaft axis 45 but an axis parallel thereto. The rotational axis of the flywheel 54 will be referred to herein interchangeably as the output shaft axis 45 and the crankshaft axis 45 for simplicity as they are the same in the illustrated embodiment but it should be understood that the output shaft axis could be different from the crankshaft axis 45.

Figure 10:
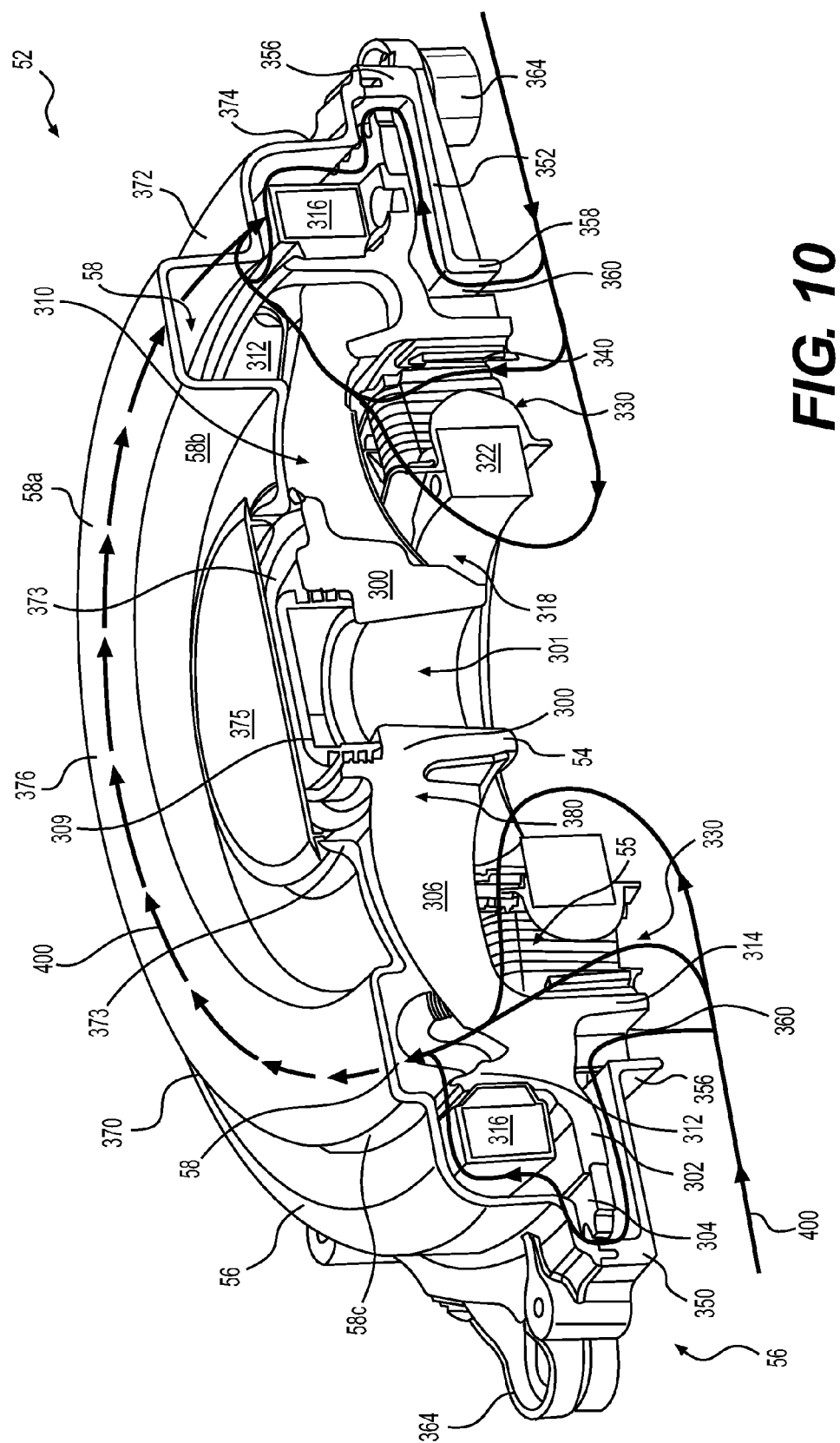
FIG. 10 is a longitudinal cross-sectional view of the flywheel assembly of FIG. 7.
Figure 11:
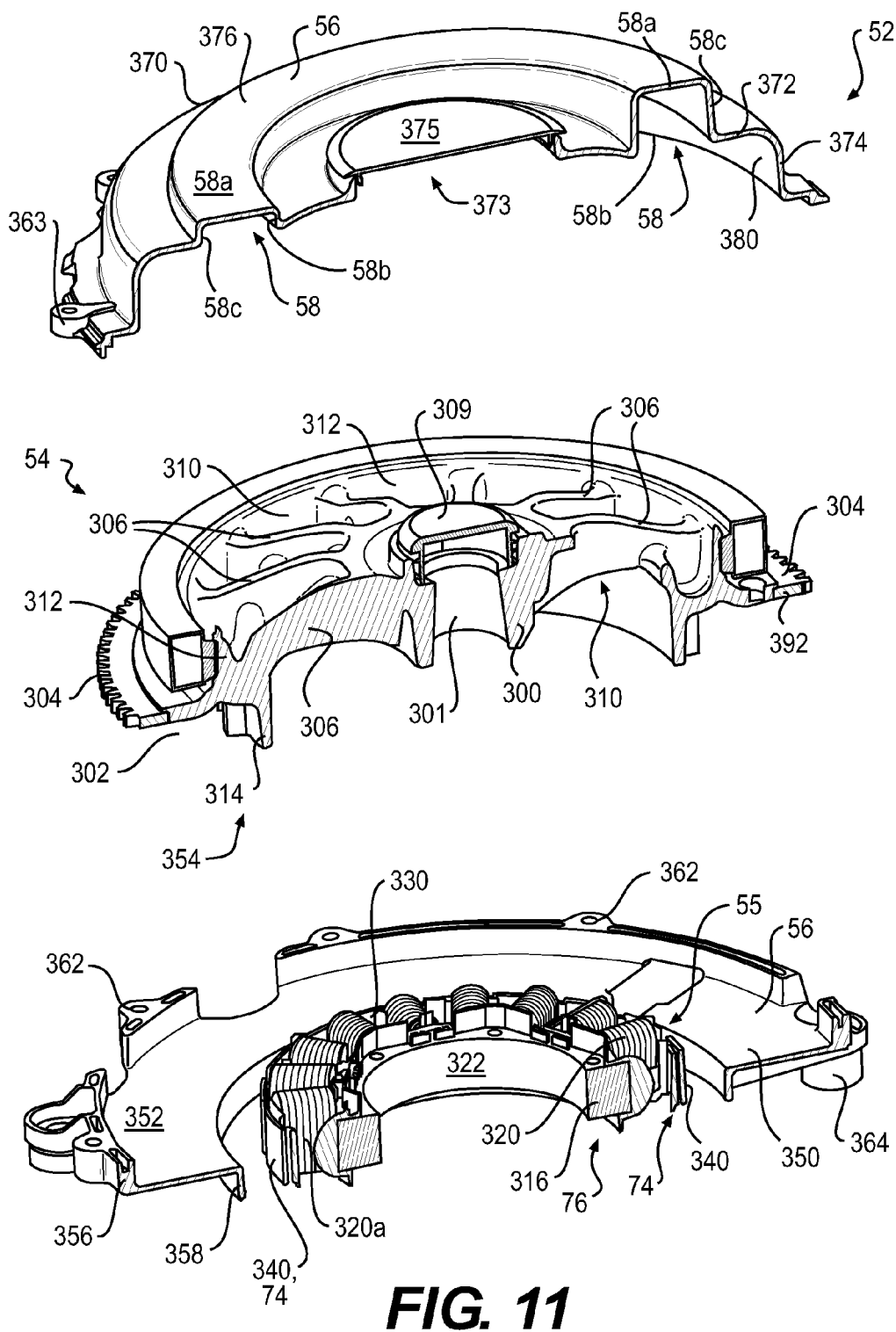
FIG. 11 is an longitudinal cross-sectional view of the flywheel assembly of FIG. 7.

An annular weight 316, also concentric with the hub 300, is mounted to the outer ring 312 radially outwardly thereof. The annular weight 316 provides inertial mass to the flywheel 54. The annular weight 316 is fixed to the radially-outwardly facing surface of the outer ring 312, but it is contemplated that the ring 316 could be fixed to the outer rim 302 instead of, or in addition to, the outer ring 312. The outer ring 312 extends higher than the annular weight 316, but it is contemplated that the annular weight 316 could extend higher than the outer ring 312. It is also contemplated that the annular weight 316 could be mounted to the radially inwardly facing surface of the outer ring 312. It is contemplated that the annular weight 312 could be formed integrally with the outer ring 312. In the illustrated embodiment, the annular weight 316 is attached to the outer ring 312 of the flywheel 54 by being bonded thereto, but it is contemplated that the annular weight 316 could be attached to the flywheel 54 by other means. It is also contemplated that the annular weight 316 could be fixed to the outer rim 302 via a resilient dampening material. It is contemplated that the annular weight 316 could be removably attached to the flywheel 54 so that the mass of the flywheel 54 can be adjusted by using an annular weight 316 having the desired mass. It is also contemplated that multiple annular weights 216 could be fixed to the flywheel 54 for providing an adjustable inertial mass. The ring 312 has a rectangular radial cross-section as can be seen in FIG. 10, but it is contemplated that the radial cross-section of the ring 316 could be other than rectangular, for example, circular.

The rotor 74 comprises eighteen permanent magnets 340 attached to the radially inwardly facing surface of the inner ring 314 of the flywheel 54. It is contemplated that the number of magnets 340 could be more or less than eighteen. The magnets 340 therefore rotate with the flywheel 54 about the output shaft axis 45. It is contemplated that the rotor 74, including the magnets 340 mounted on an annular rotor frame, could be formed separately from the flywheel 54 and connected thereto either removably or permanently. It is contemplated that the rotor 74 could be connected to the crankshaft 46 independently of the flywheel 54.

Figure 9:
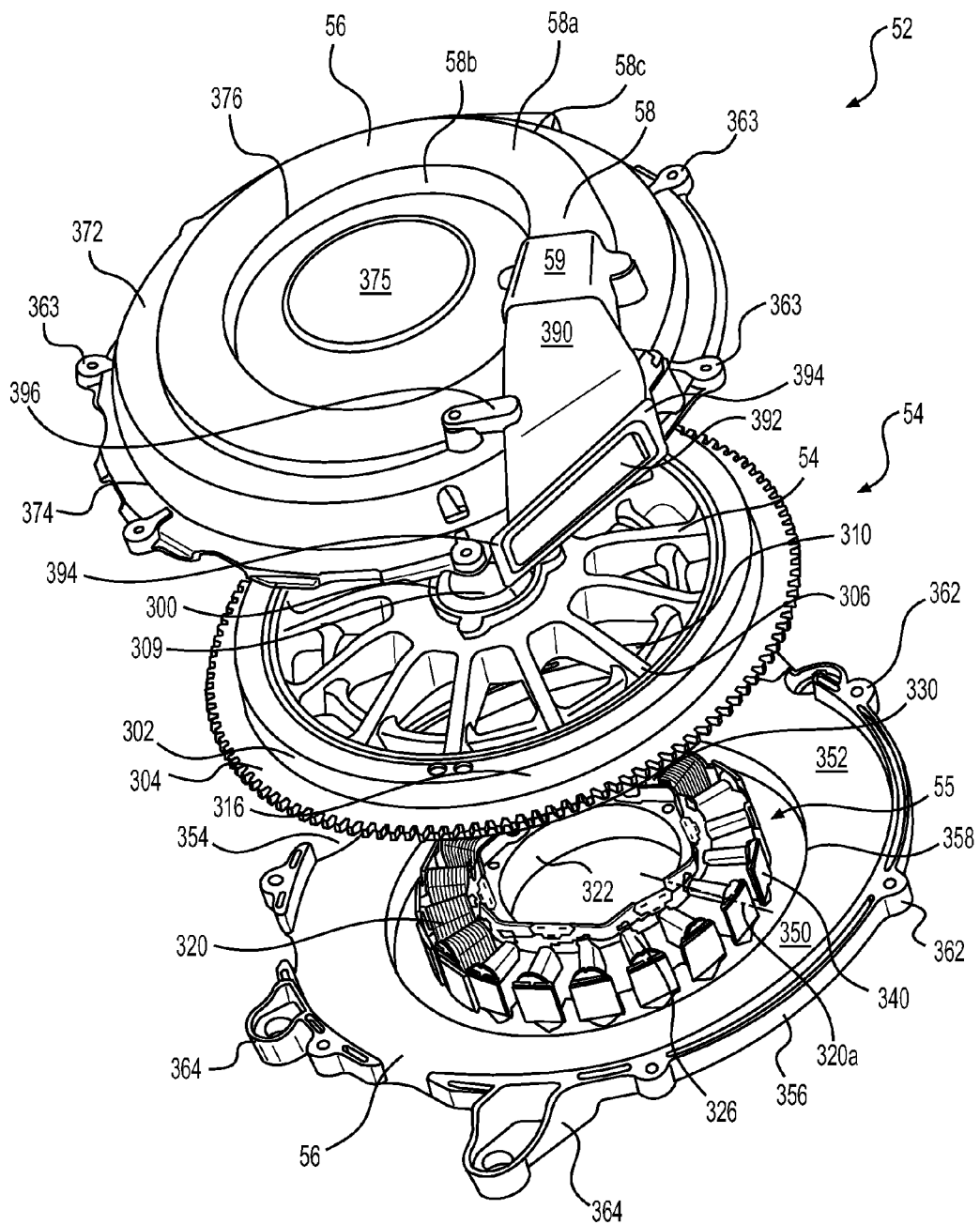
FIG. 9 is another exploded perspective view, taken from a top, front, left side of the flywheel assembly of FIG. 7.

The stator 76 includes eighteen solenoid coils 320 mounted on an annular frame 322. The frame 322 has an inner circular portion disposed concentrically with the crankshaft 46 and the hub 300 of the flywheel 54. An annular gap 318 is formed between the stator frame 322 and the flywheel hub portion 300. The frame 322 is bolted to the top of the engine block 40. The frame 322 also comprises eighteen coil mounting members 326 projecting radially outwardly from the circular portion of the frame 322. Copper wires are wound around the coil members 326 to form the solenoid coils 320. A central axis 320a of each coil 320 extends in a radially outward direction. Consecutive coils 320 are separated by gaps 330. It is contemplated that the stator 76 could have more or less than eighteen coils 320. It is contemplated that the number of coils 320 of the stator 76 could be more or less than the number of rotor magnets 340. The stator 76 is mounted so that the coil axes 320a are centered with respect to the magnets 340 in the axial direction as can be seen in FIG. 9 for example.

The circumferential direction width of each coil 320 is less than the circumferential direction width of each magnet 340. The axial direction height of each coil 320 is less than the axial direction height of each magnet 340. It is contemplated that the circumferential direction width of a magnet 340 could be equal to or less than the circumferential direction width of a coil 320. It is contemplated that the axial direction height of a magnet 340 could be equal to or less than the axial direction height of a coil 320.

As the flywheel 54 rotates, each rotor magnet 340 rotates about the crankshaft axis 46a and the stator 76 passing radially outwardly by each of the coils 320. Each coil 320 experiences a varying magnetic field which has a maximum strength when the center of one of the magnets 74 is aligned with the coil axis 320a in the circumferential direction and a minimum strength when the coil axis 320a is aligned in the circumferential direction with the center of a gap between two neighboring magnets 340. The varying magnetic field induces a current in each coil 320 which is electrically connected In the illustrated embodiment of the engine 20, the flywheel 54 and the crankshaft 46 rotate in a clockwise direction when viewed from above. It is however contemplated that the flywheel 54 and the crankshaft 46 could rotate in a counter-clockwise direction when viewed from above.

The flywheel cover 56 extends above, around and below the flywheel 54. The flywheel cover 56 has a lower portion 350 and an upper portion 370. The flywheel cover forms a chamber 380 housing the flywheel 54.

The flywheel cover 56 is made of molded plastic but it is contemplated that the flywheel cover 56 could be made of other suitable materials. It is contemplated that the flywheel cover 56, or a part thereof, could be made of transparent material to aid in the initial installation/configuration of the flywheel assembly 52.

Figure 12:
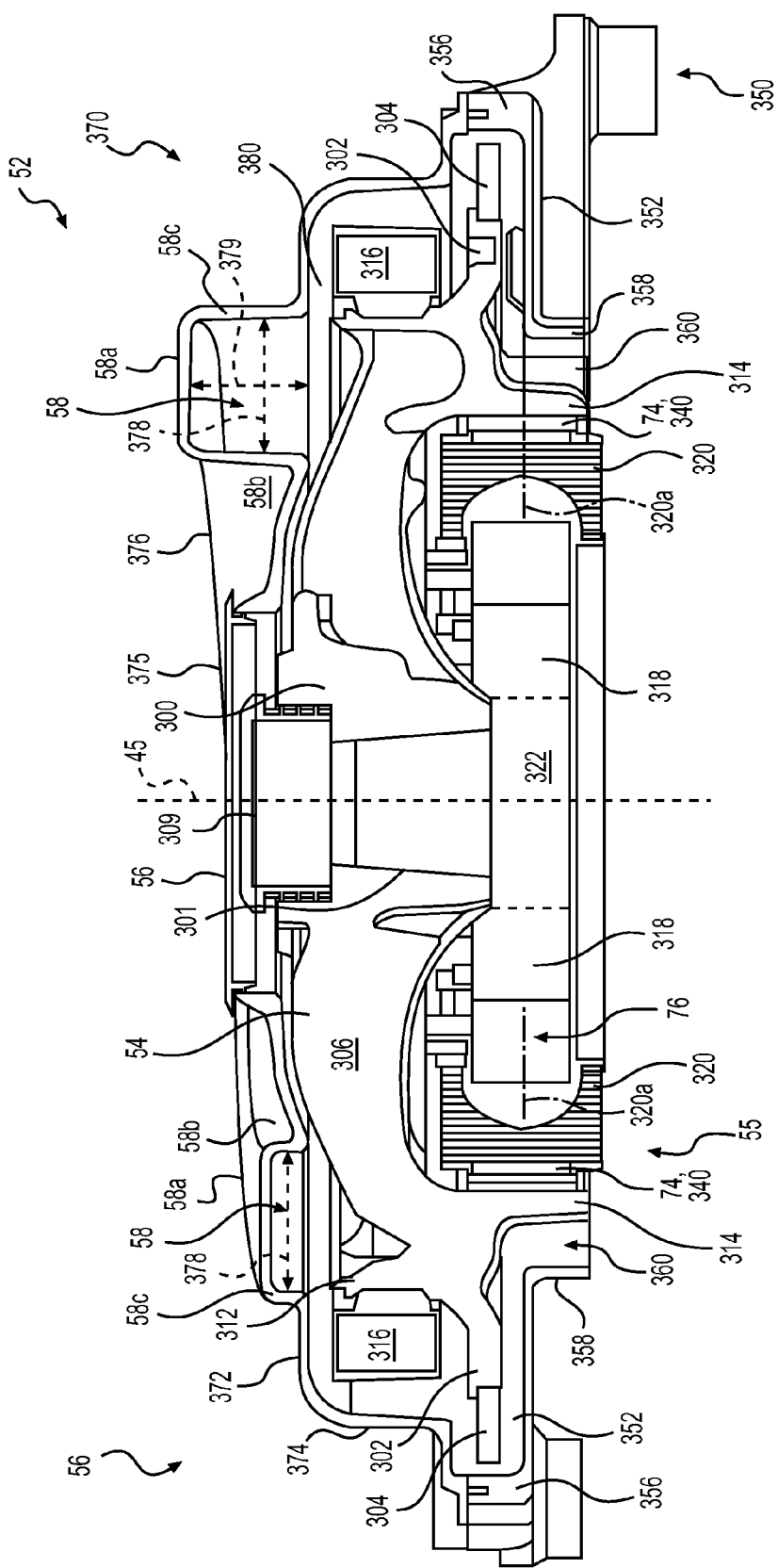
FIG. 12 is a longitudinal cross-sectional view of the flywheel assembly of FIG. 7.
Figure 13:
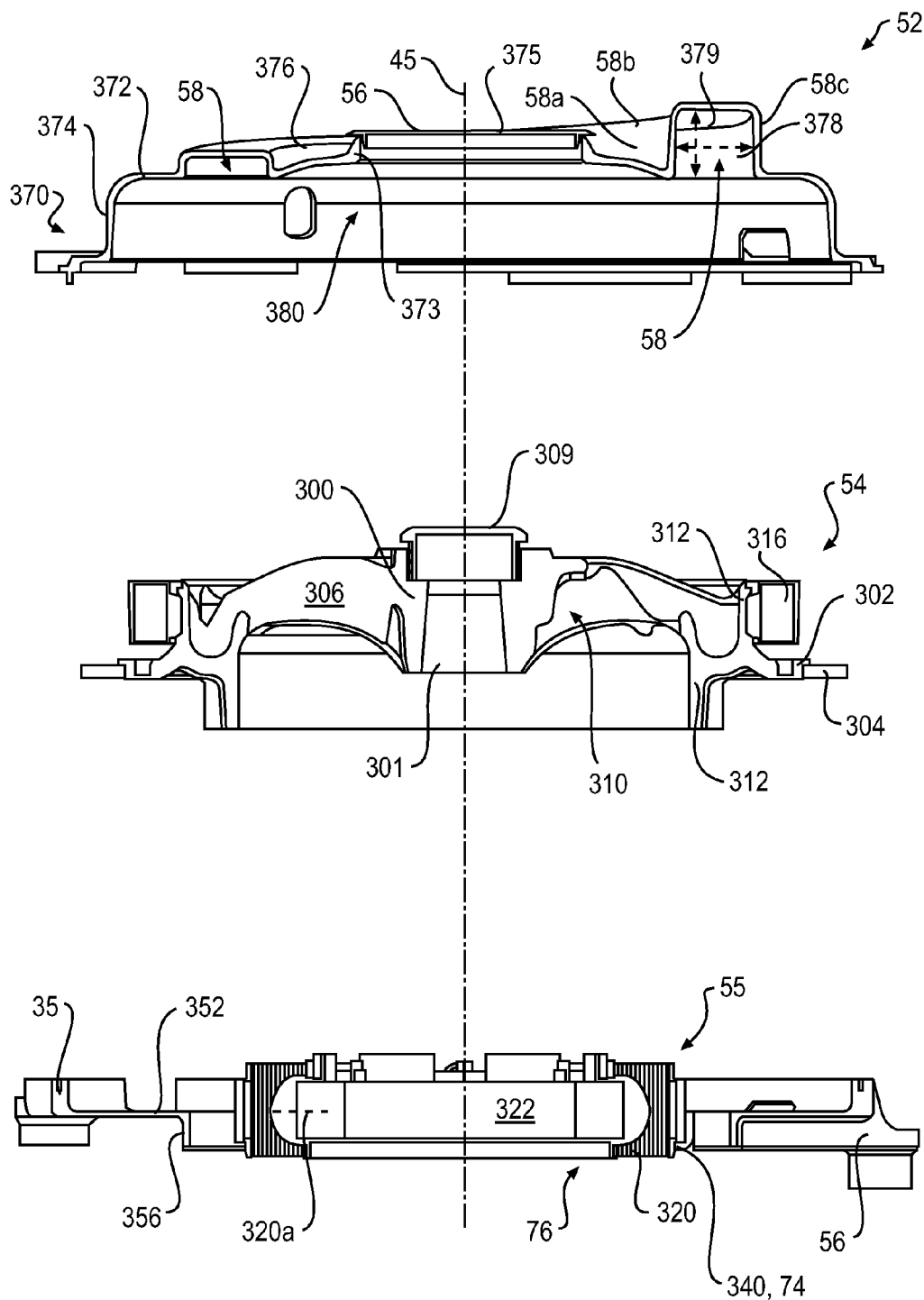
FIG. 13 is an exploded longitudinal cross-sectional view of the flywheel assembly of FIG. 7.
Figure 14:
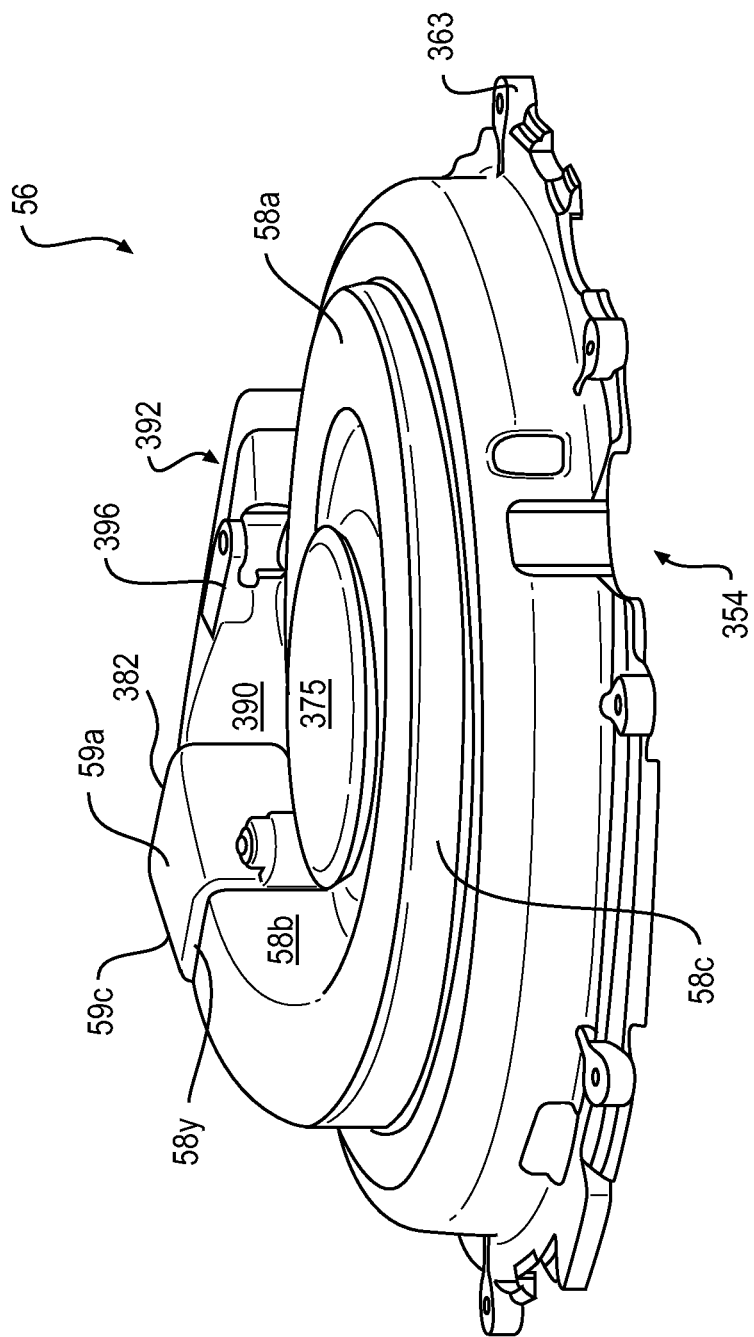
FIG. 14 is a perspective view, taken from a front, right side of the flywheel cover of the flywheel assembly of FIG. 7.

The lower portion 350 includes an annular plate 352 disposed radially outward of the stator 74. The annular plate 352 is concentric with the flywheel 54, the stator 76 and the crankshaft 46. The annular plate 352 is disposed below the ring gear 304 and the outer rim 302 of the flywheel 54 as can be seen in FIG. 12.

An outer projection 356 extends upwards from portions of the outer circumferential edge of the annular plate 352. The outer projection 356 is disposed radially outwardly of the ring gear 304 and extends above the ring gear 304. The outer projection 356 is discontinuous and forms gaps along the outer circumferential edge. A recess 354 (FIG. 9) extends inwards into the annular plate 352 from its outer circumferential edge through which the starter motor 73 can engage the ring gear 304.

An inner projection 358 extends downwardly from the inner circumferential edge of the annular plate 352, and radially outwardly of the inner ring 316 extending downwards from the flywheel 54. The inner projection 358 is formed continuously along the inner circumferential edge of the annular plate 250. The inner projection 358 defines an annular gap 360 (FIG. 12) with the radially outwardly facing surface of the inner ring 316. The lower ends of the inner ring 316 of the flywheel 54 and the inner projection 358 of the lower portion 350 are disposed at the same level. The coils 320 of the stator 76 extend lower than the inner projection 358.

The lower portion 350 is fastened to the upper portion 370 via flanges 362 extending radially outwardly from the outer projection 356 and corresponding flanges 363 of the upper portion 370. Fasteners are inserted through apertures of the flanges 362, 363 to removably fasten the upper portion 370 to the lower portion 350. Flanges 364 extending from the outer surface 356 of the lower plate 250 are used to bolt the lower portion 350 to the top of the engine block 40 as can be seen clearly in FIG. 4B.

With reference to FIGS. 14 to 18, the upper portion 370 of the flywheel cover 56 has an end portion 372, a side portion 374, and a channel member 376. The side portion extends upward from the lower portion 350 radially outwardly of the flywheel 54. The end portion extends over the flywheel 54. The channel member 376 is disposed on the end portion 372 and above the flywheel 54. The end portion 372 has a central opening concentric with the crankshaft 46 and capped by a removable cover 375.

The channel member 376 defines a channel 58 extending in a circumferential direction. The channel 58 is a helical channel 58 extending 360° in the circumferential direction about the crankshaft axis 45. The channel 58 extends from a first end 58x to a second end 58y.

In the illustrated embodiment, the channel member 376 is formed integrally with the end portion 372 and side portion 374 of the flywheel cover 56. It is however contemplated that the channel member 376 could be formed separately from the end and side portion 372, 374 and removably attached thereto.

The channel 58 is defined by a top wall 58a, an inner wall 58b, and an outer wall 58c of the channel member 376. The inner wall 58b is in the form of a cylinder extending coaxially with the crankshaft axis 45. The outer wall 58c is in the form of a cylinder extending concentrically with the inner wall 58b and radially outwardly thereof. The top wall 58a connects between the inner and outer walls 58b, 58c. The bottom edges of the inner and outer walls 58b, 58c are disposed at the same level in the axial direction but not connected to each other on the side opposite to the opposite to the top wall 58a. The channel 58 is therefore continuous with the chamber 380 in the axial direction.

With reference to FIGS. 5, 6, 10 and 12, the outer wall 58c of the circumferentially extending channel 58 is disposed radially inwardly of the outer ring 312 and radially inwardly compared to the annular weight 316 of the flywheel 54. The inner wall 58b of the channel 58 is disposed radially inwardly compared to the inner ring 314 of the flywheel 54. The channel 58 disposed radially outwardly of the gaps 310 between the flywheel spokes 306. The channel 58 is disposed so as to receive air flowing past the stator coils 320 when the flywheel 54 is rotating.

It is contemplated that the top wall 58a could be disposed at an angle other than 90° with respect to the inner wall 58b and at a complementary angle to the outer wall 58c so as to form a channel 58 having a shape of a parallelogram in a radial direction cross-section.

With reference to FIGS. 12 to 14, 19 and 20, in a radial cross-section, the shape of the channel 58 formed by the cylindrical walls 58b, 58c and the top wall 58a is generally rectangular. The top wall 58a is disposed generally perpendicular to the inner and outer walls 58b, 58c. The channel 58 has a width 378 in the radial direction. The radial direction width 378 (FIG. 17) is defined as the radial direction distance between the inner and outer walls 58b, 58c.

Instead of the cylindrical inner and outer walls 58b, 58c of the illustrated embodiment which form a rectangular channel 58, it also contemplated that the inner and outer walls 58b, 58c could be in the form of a conical frustum so as to form a trapezoidal channel 58. The radial direction width 378 between the walls 58b, 58c of the trapezoidal channel 58 would be increasing in a downward direction away from the top wall 58a. It is also contemplated that the walls 58a, 58b, 58c could be curved so as to form a channel 58 having a circular or elliptical shape in a radial direction cross-section. It is further contemplated that the channel 58 could be formed by more or fewer walls than as shown in the illustrated embodiment.

The channel 58 has a height 379 (FIGS. 12 and 13) in the axial direction defined by the axial direction distance between the top wall and the bottom edge of the lower of the inner and outer walls 58b, 58c. The axial direction height 379 of the channel 58 increases continuously from the first end 58x to the second end 58y in a clockwise direction (as viewed from above) along the channel 58.

The cross-sectional area of the channel 58 therefore increases as the channel 58 extends in a clockwise direction. The channel 58 is a volute-shaped channel 58 which increases in cross-sectional area as it curves about the crankshaft axis 45 in a clockwise direction. The clockwise volute 58 facilitates airflow 400 out of the flywheel chamber 380 as will be discussed below.

Figure 15:
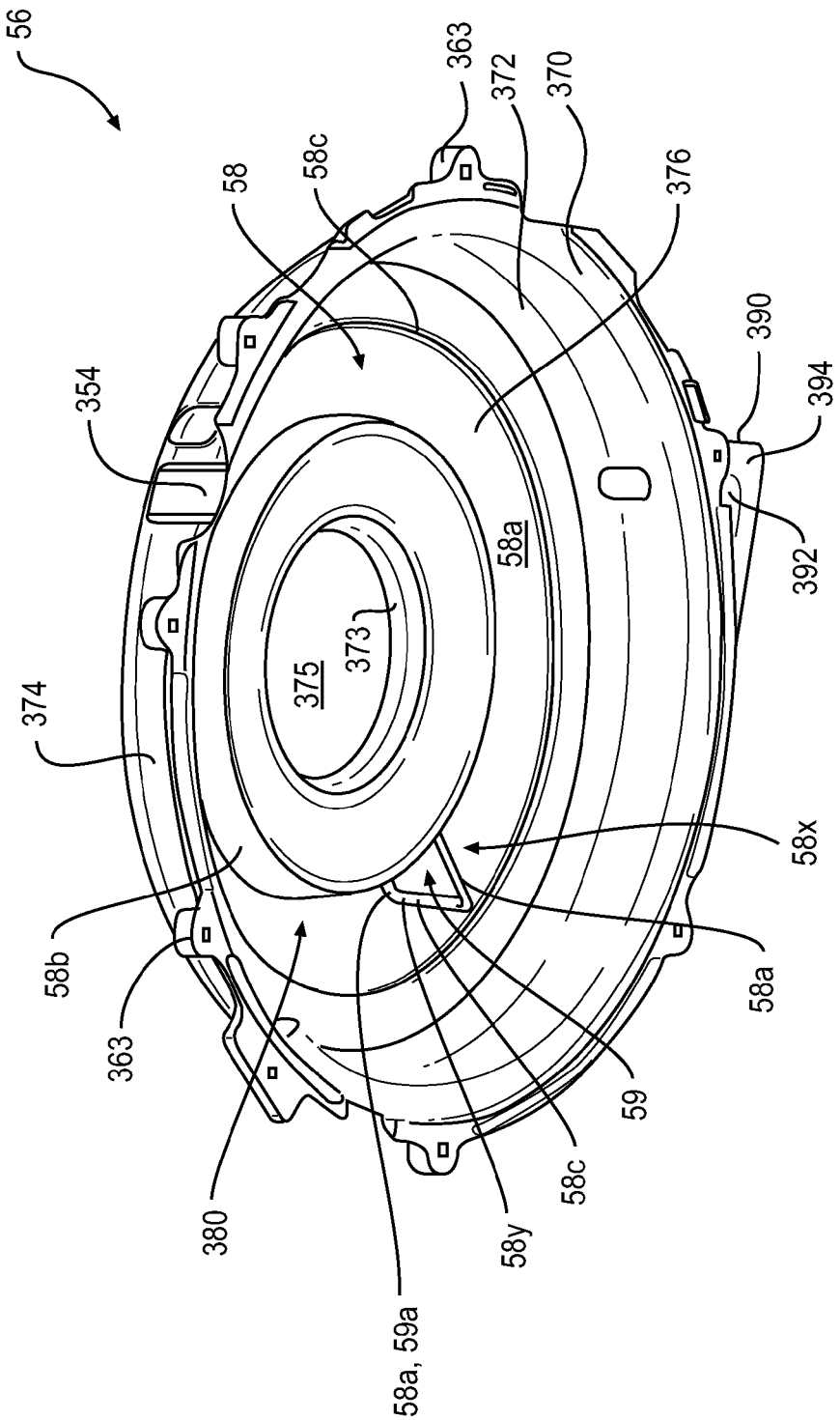
FIG. 15 is a perspective view, taken from a bottom, right side of the flywheel cover of FIG. 14.
Figure 16:
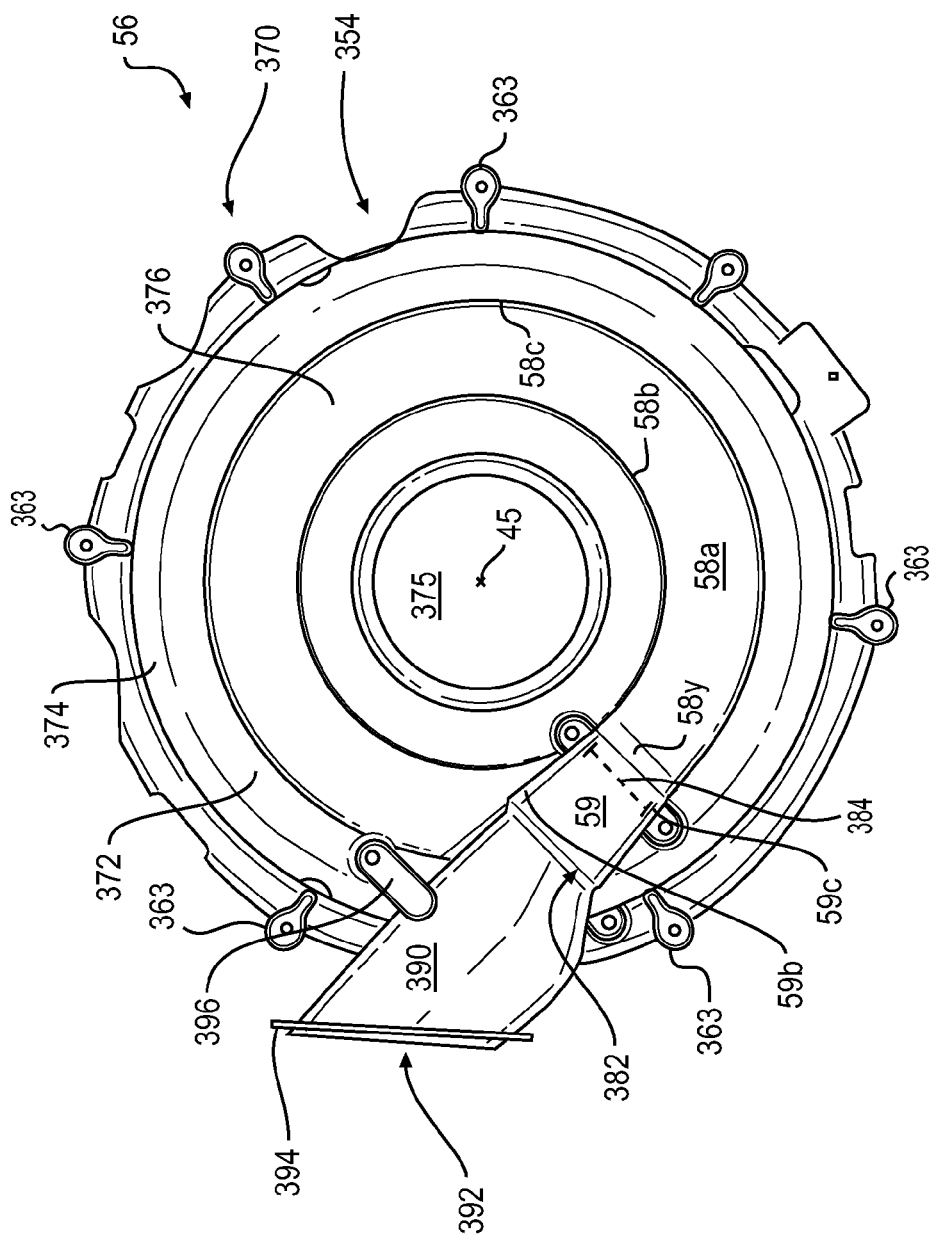
FIG. 16 is a top plan view of the flywheel cover of FIG. 14.

As can be seen in FIG. 15, the first and second ends 58x, 58y of the channel 58 are offset in the vertical direction but aligned in the circumferential directions. The top wall 58a winds 360° around from the first end 58x to the second end 58y. The top wall 58a of the second end 58y is disposed vertically above the top wall 58a of the first end 58x. The top wall 58a of the first end 58x thus forms a bottom wall for the second end 58y of the channel 58. It is contemplated that the second end 58y of the channel 58 could be disposed less than 360° from the first end 58x so that the top wall 58a of the second end 58y does not overlap the top wall 58a of the first end 58x.

In the illustrated embodiment, the channel 58 extends only in a circumferential direction. It is also contemplated that the channel 58 could extend radially outwardly from the first end 58x towards the second end 58y so as to form a outwardly-spiraling channel 58. It is contemplated that one or more portions of the channel 58 could be extending in a straight line. It is contemplated that one or more portions of the channel 58 could be extending in a radial direction only and not in the circumferential direction.

Figure 17:
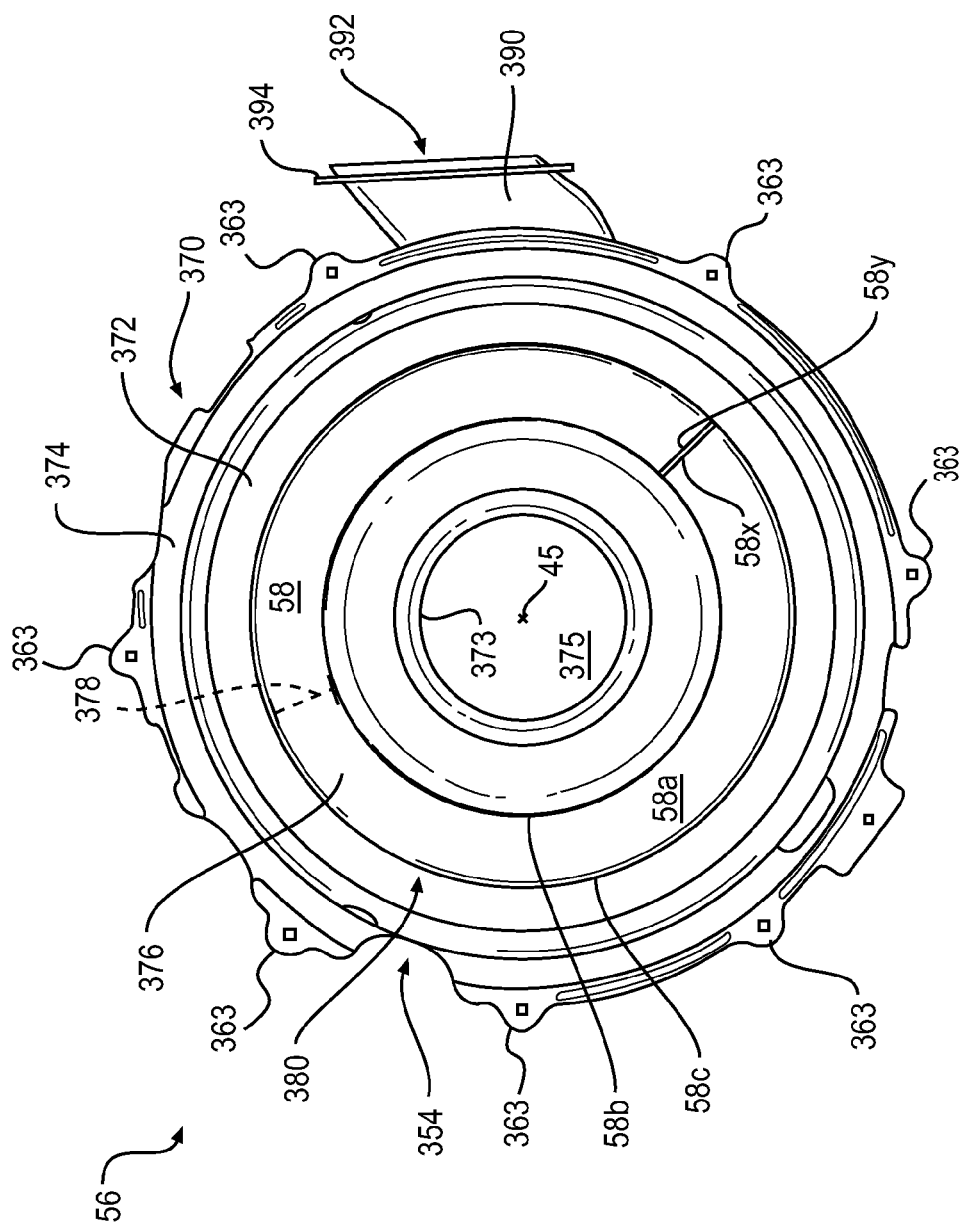
FIG. 17 is a bottom plan view of the flywheel cover of FIG. 14.
Figure 18:
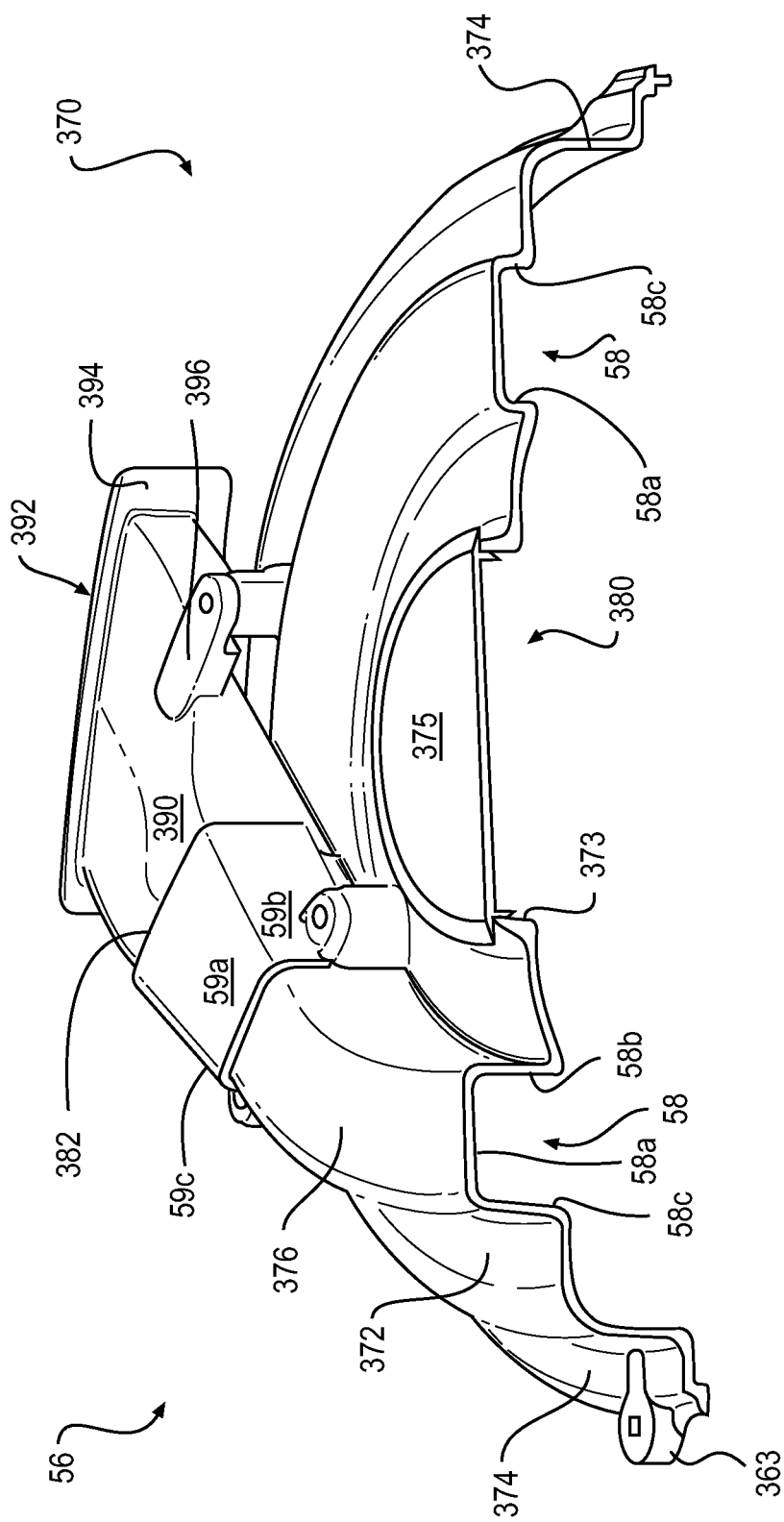
FIG. 18 is a longitudinal cross-sectional view of the flywheel cover of FIG. 14.

With reference to FIGS. 15 and 17, from the second end 58y, the channel 58 continues in a clockwise direction as a passage 59 defined by the channel member 376. The passage 59 extends from the second end 58y of the channel 59 to an outlet 382. The second end 58y of the channel 58 is thus the inlet of the passage 59. The passage 59 has opposing side walls 59b and 59c, a top wall 59a and a bottom wall 58a which is the top wall 58 of the channel 58 disposed therebelow. The top wall 59a is formed continuously with the top wall 58a. The side walls 59b and 59c diverge away from each other. The radial direction width 384 (FIG. 16) of the passage 59 increases as the passage 59 extends away from the second end 58y to the outlet 382.

A connection tube 390 is connected to the outlet 382 of the passage 59. The connection tube 390 extends from the channel member 376 and through the aperture 124 (FIG. 2B) of the cowling support structure 105 to connect to the engine compartment outlet 122 so that air can be directed from the chamber 380 out of the engine compartment 102 and outboard engine 10 via the channel 58 and the passage 59. The connection tube 390 defines a rectangular outlet 392 which is connected to the rectangular engine compartment outlet 122. It is contemplated that the connection tube outlet 392 and the engine compartment outlet 122 could have a shape other than rectangular. A flange 394 of the connection tube 390 is used to secure the connection tube 390 to the cowling 100 around the engine compartment outlet 124. The connection tube is also fastened to the flywheel cover 56 via a tab 396.

In the illustrated embodiment, the engine compartment outlet 122 is disposed in part forward of the output shaft axis 45 and the passage 59 having the outlet 382 is disposed rearward of the output shaft axis 45 as can be seen in FIGS. 4A and 4B. The connection tube 390 therefore extends forwardly and laterally from the outlet 382 to the engine compartment outlet 122. Such a configuration, wherein the connection tube 390 between the flywheel cover 56 and the engine compartment outlet 122 extends both forwardly and laterally, has the advantage of being able to prevent rain water from entering the engine through the connection tube 390 when the watercraft is tilted up, for example, while in dock. The connection tube 390 is a rigid structure made of plastic. It is also contemplated that the connection tube 390 could be flexible instead of rigid. For example, the connection tube 390 could be made of flexible rubber material. The non-rigid connection tube 390 could aid in minimizing transmission of vibrations from the engine 20 to the cowling 100.

The rotating flywheel 54 creates air turbulence under the cowling 100. As the flywheel 54 and attached rotor 74 rotate, the stator coils 320 generate heat due to the current induced therein and flowing therethrough. The flywheel cover 56 serves to at least partially isolate the magneto 55 and flywheel 54 from the engine compartment 102, thereby preventing the hot, turbulent air flowing past the flywheel 54 and magneto 55 from mixing with the cooler, fresh air flowing through the engine compartment 102 towards the air intake system 60. The flywheel cover 56 also serves to route fresh air past the magneto 55 and directly out of the engine compartment 102, thereby improving cooling of the magneto 55 and reducing the heat transfer from the magneto 55 to the combustion air. The flywheel cover 56 therefore ensures that the air flowing through the engine compartment 102 to the combustion chamber of the engine 20 is not made hotter due to the heat generated by the stator 76 or more turbulent due to the rotation of the flywheel 54.

Figure 8:
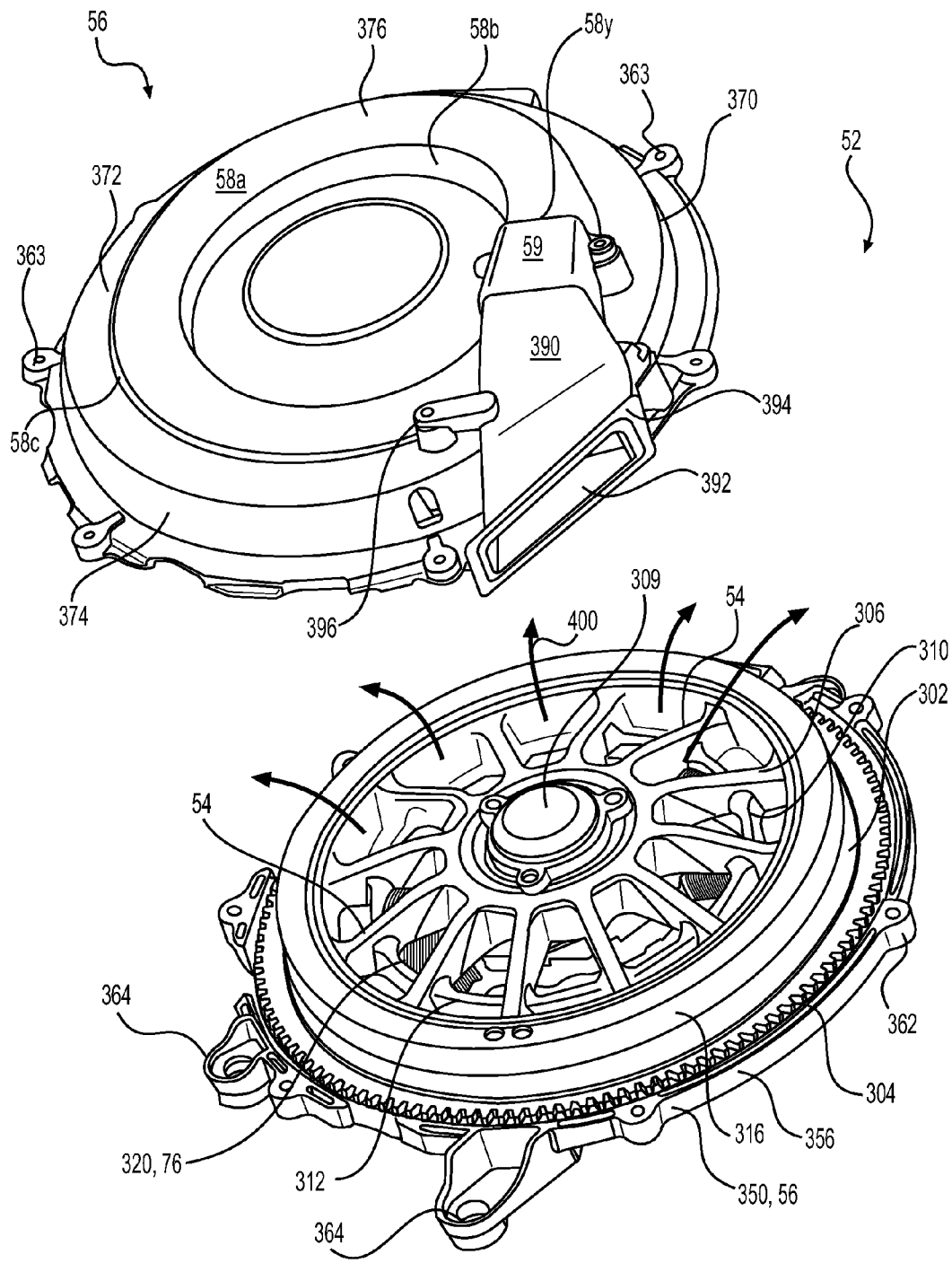
FIG. 8 is an exploded perspective view, taken from a top, front, left side of the flywheel assembly of FIG. 7.

With reference to FIGS. 8 and 10, air around the flywheel assembly 52 in the engine compartment 102 flows radially inwardly below the flywheel cover lower portion 250 and upwardly into the flywheel chamber 380. A portion of the airflow 400 flows upward through the gap 360 between the flywheel cover lower portion 350 and the flywheel outer ring 314 and then along the inner surface of the flywheel cover upper portion 370 to the channel 58. A portion of the airflow 400 flows upwardly through the gaps 330 between the stator coils 320 and through the gap 318 between the stator 76 and the flywheel hub 300. As the flywheel 54 rotates, the airflow 400 flowing upward past the stator coils 320 becomes hotter. The airflow 400 flowing upwardly is also spun radially outwardly and in a clockwise direction due to the clockwise direction rotation of the flywheel 54. The hot airflow 400 then passes through the gaps 310 between the flywheel spokes 306 to be received in the channel 58 disposed radially outwardly of the gaps 310. The channel 58 directs the airflow 400 out of the chamber 380 and the engine compartment 102 via the passage 59 and the connection tube 390, thereby cooling the stator 76 and preventing heating of the air inside the engine compartment 102 by the stator 74.

In the channel 58, the airflow 400 flows in a clockwise direction toward the second end 58y adding to the air already received in those portions of the channel 58 disposed further clockwise thereto. Since the cross-sectional area of the channel 58 increases toward the second end, the air pressure remains substantially constant as the airflow 400 along the channel 58 is directed out of the flywheel chamber 380 and the outboard engine 10. In the illustrated embodiment, the outlet 122 formed in the cowling 100, and the outlet 392 of the connection tube 390 are formed as unobstructed openings. It is also contemplated that the outlet 392 or the outlet 122 could be formed with fins, louvers, bars, or the like, extending across the openings for directing air flowing out of the outlet 122, 392 or to prevent entry of debris into the flywheel chamber 380.

It is contemplated that the channel 58 could be formed radially outwardly of the flywheel 54. The channel 58 could extend circumferentially around the flywheel 54 so as to be continuous with the chamber 380 in the radial direction. In this case, the channel member 376 could be attached to the side portion 374 of the flywheel cover 56.

Although, the flywheel assembly 52 has been described with respect to an outboard engine 10. It should be understood that the flywheel assembly 52 could be used with an inboard engine, or with any other internal combustion engine in which a flywheel is directly connected to a crankshaft or an engine output shaft.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. An outboard engine for propelling a watercraft, the outboard engine comprising:
   a cowling defining an engine compartment and an engine compartment outlet fluidly communicating with the engine compartment;
   an engine housed in the engine compartment, the engine comprising:
      an engine block;
      an output shaft housed in part in the engine block and defining an output shaft axis, an axial direction, a radial direction and a circumferential direction, an outer end of the output shaft extending outside the engine block;

a flywheel mounted to the outer end of the output shaft to rotate therewith; and a flywheel cover fixed with respect to the engine block and defining a chamber housing the flywheel, the flywheel being disposed between the engine block and the flywheel cover in the axial direction, the flywheel being disposed between the output shaft and the flywheel cover in the radial direction, the flywheel cover comprising:

a channel member, the channel member defining a channel extending between a first end and a second end, the second end fluidly communicating with the engine compartment outlet, at least a portion of the channel extending in a circumferential direction, being open to the chamber and being continuous with the chamber for directing air out of the chamber, the channel member defining a cross-sectional area of the channel, the cross-sectional area of the circumferentially-extending portion increasing towards the second end.

2. The outboard engine of claim 1, wherein the flywheel is disposed between the channel and the engine block in the axial direction.

3. The outboard engine of claim 2, wherein the circumferentially extending portion of the channel is continuous with the chamber in the axial direction.

4. The outboard engine of claim 1, wherein the channel member defines a height of the channel in the axial direction, and an axial direction height of the circumferentially extending portion increases towards the second end.

5. The outboard engine of claim 1, wherein a portion of the flywheel is disposed further outward than the channel in the radial direction.

6. The outboard engine of claim 1, wherein the flywheel cover comprises a lower portion disposed between the flywheel and the engine block in the axial direction.

7. The outboard engine of claim 1, further comprising a connector attached to the flywheel cover and the cowling, the connector defining a passage fluidly communicating the second end of the channel with the engine compartment outlet for directing air flowing through the channel out of the engine compartment.

8. The outboard engine of claim 1, wherein the channel member is integrally formed with the flywheel cover.

9. The outboard engine of claim 1, further comprising a generator disposed at least in part in the chamber, the generator comprising:

a rotor mounted to the output shaft to rotate therewith; and a stator connected to the engine block, the stator being concentric with the output shaft, at least a portion of the stator being disposed between the flywheel cover and the output shaft in the radial direction.

10. The outboard engine of claim 9, wherein the rotor is mounted to the flywheel.

11. The outboard engine of claim 9, wherein the stator is disposed between the flywheel and the engine block in the axial direction.

12. The outboard engine of claim 9, wherein:

the flywheel cover comprises a lower portion disposed between the flywheel and the engine block in the axial direction; and at least a portion of the stator is disposed between the lower portion and the output shaft in the radial direction.

13. The outboard engine of claim 12, further comprising an air gap extending in the radial direction between the stator and at least one of:

the lower portion of the flywheel cover; and the output shaft.

14. The outboard engine of claim 1, wherein the engine compartment outlet is disposed at least in part longitudinally forward of the output shaft axis.

15. A cover for a flywheel mounted to an output shaft of an engine, the output shaft defining an output shaft axis, the cover comprising:

an end portion;

a side portion connected to the end portion;

a chamber for housing the flywheel defined at least in part by the end and side portions; and a channel member connected to at least one of the end and side portions, the channel member defining a channel extending between a first end and a second end, the second end adapted to direct air from the chamber through the channel away from the chamber, at least a portion of the channel extending in a circumferential direction with respect to the output shaft axis, being open to the chamber and being continuous with the chamber for directing air out of the chamber, the channel member defining a cross-sectional area of the channel, the cross-sectional area of the circumferentially-extending portion increasing towards the second end.

16. The cover of claim 15, wherein the circumferentially extending portion of the channel is continuous with the chamber in a direction parallel to a direction of the output shaft axis.

17. The cover of claim 15, further comprising a lower portion, the chamber being disposed at least in part between the end and lower portions in a direction parallel to a direction of the output shaft axis.

18. The cover of claim 15, wherein:

the channel member is adapted to be attached to the engine; and the channel outlet is adapted to connect to an outlet of the engine for directing air flowing through the channel out of the outboard engine.

19. The cover of claim 15, wherein the channel member is integrally formed with at least one of the end and side portions.

20. The outboard engine of claim 1, wherein the circumferentially extending portion of the channel is continuous with the chamber in the axial direction.

* * * * *